United States Patent
Ogawa

(10) Patent No.: US 12,335,610 B2
(45) Date of Patent: Jun. 17, 2025

(54) IMAGE DATA TRANSMISSION APPARATUS, IMAGE DATA TRANSMISSION METHOD, AND STORAGE MEDIUM

(71) Applicant: Sumitomo Electric Industries, Ltd., Osaka (JP)

(72) Inventor: Akihiro Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 131 days.

(21) Appl. No.: 18/035,308

(22) PCT Filed: Nov. 1, 2021

(86) PCT No.: PCT/JP2021/040235
§ 371 (c)(1),
(2) Date: May 4, 2023

(87) PCT Pub. No.: WO2022/097602
PCT Pub. Date: May 12, 2022

(65) Prior Publication Data
US 2023/0403463 A1    Dec. 14, 2023

(30) Foreign Application Priority Data
Nov. 4, 2020    (JP) ................ 2020-184132

(51) Int. Cl.
*H04N 23/667*    (2023.01)
*H04N 23/61*    (2023.01)
*H04N 23/661*    (2023.01)

(52) U.S. Cl.
CPC .......... *H04N 23/667* (2023.01); *H04N 23/61* (2023.01); *H04N 23/661* (2023.01)

(58) Field of Classification Search
CPC ................ H04N 23/61; H04N 23/667
USPC ............................................ 348/207.99
See application file for complete search history.

(56) References Cited

U.S. PATENT DOCUMENTS

| 9,916,760 | B1 * | 3/2018 | Balasubramanian ............... G01C 21/3694 |
| 2007/0140527 | A1 | 6/2007 | Yamamoto et al. |
| 2019/0096244 | A1 * | 3/2019 | Guruva Reddiar ............... G08G 1/096741 |
| 2019/0158732 | A1 * | 5/2019 | Shimauchi ............ H04N 23/67 |
| 2019/0356850 | A1 * | 11/2019 | Ashrafi ................ H04N 23/667 |
| 2020/0125864 | A1 | 4/2020 | Hirano |

(Continued)

FOREIGN PATENT DOCUMENTS

| JP | 2007-172035 A | 7/2007 |
| JP | 2008-263580 A | 10/2008 |

(Continued)

*Primary Examiner* — Anthony J Daniels
(74) *Attorney, Agent, or Firm* — XSENSUS LLP

(57) ABSTRACT

An image data transmission apparatus includes a resolution decision unit configured to decide on a resolution of an image captured by an imaging sensor, in accordance with a combination of a distance between the imaging sensor and an object and a type of an attribute that is a determination target, a transmission data generation unit configured to generate transmission data from data of the image, in accordance with the resolution decided on by the resolution decision unit, and a wireless communication device configured to wirelessly transmit the transmission data that has been generated to a transmission destination.

9 Claims, 14 Drawing Sheets

(56) References Cited

U.S. PATENT DOCUMENTS

2022/0189038 A1   6/2022  Yamazaki et al.
2023/0370709 A1* 11/2023  Ozone .................... G06V 10/75

FOREIGN PATENT DOCUMENTS

| WO | 2018/003502 A1 | 1/2018 |
| WO | 2019/003996 A1 | 1/2019 |
| WO | 2020/194584 A1 | 10/2020 |

* cited by examiner

| | Simple attribute | Detailed attribute | Behavioral attribute | Body orientation | Face orientation |
|---|---|---|---|---|---|
| 5m | HD | HD | HD | HD | FHD |
| 15m | HD | HD | HD | HD | FHD |
| 50m | HD | HD | HD | FHD | QHD |
| 150m | HD | FHD | FHD | FHD | QHD |
| 150m~ | FHD | FHD | QHD | QHD | (4K) |

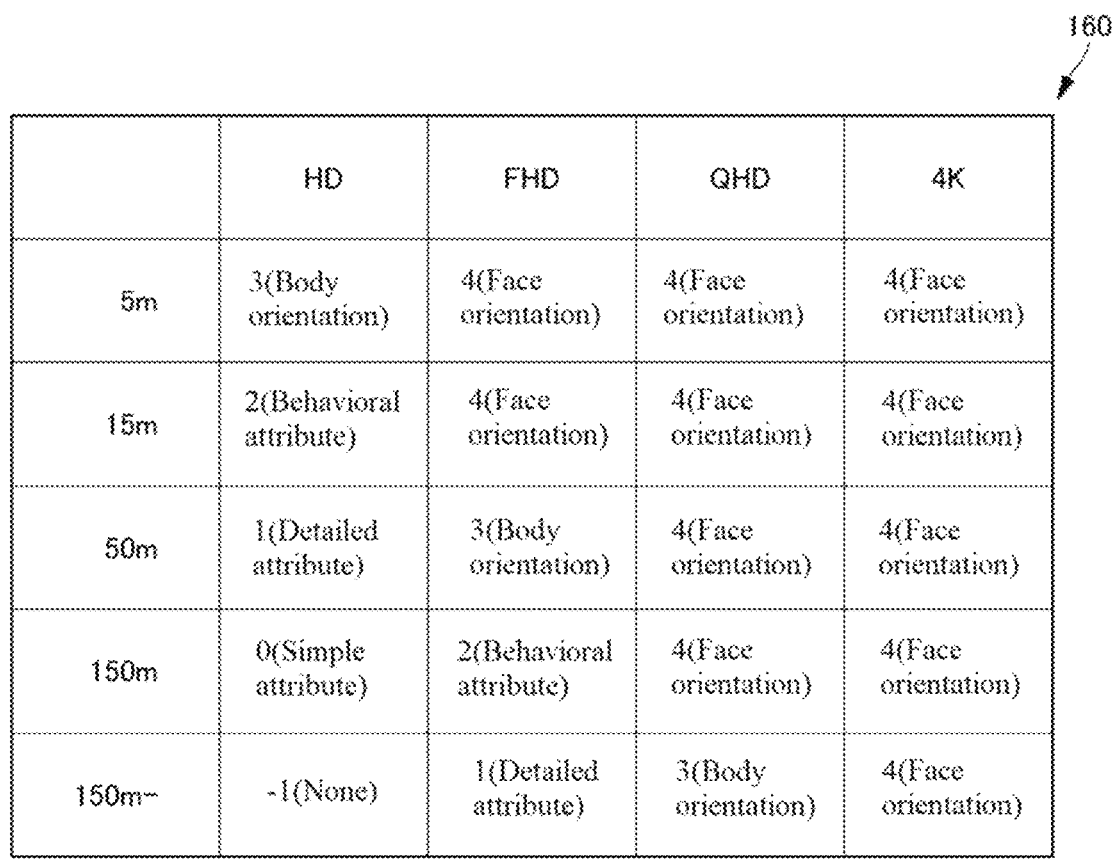

| | HD | FHD | QHD | 4K |
|---|---|---|---|---|
| 5m | 3(Body orientation) | 4(Face orientation) | 4(Face orientation) | 4(Face orientation) |
| 15m | 2(Behavioral attribute) | 4(Face orientation) | 4(Face orientation) | 4(Face orientation) |
| 50m | 1(Detailed attribute) | 3(Body orientation) | 4(Face orientation) | 4(Face orientation) |
| 150m | 0(Simple attribute) | 2(Behavioral attribute) | 4(Face orientation) | 4(Face orientation) |
| 150m~ | -1(None) | 1(Detailed attribute) | 3(Body orientation) | 4(Face orientation) |

IMAGE DATA TRANSMISSION APPARATUS, IMAGE DATA TRANSMISSION METHOD, AND STORAGE MEDIUM

CROSS-REFERENCE TO RELATED APPLICATION

The present application is based on PCT filing PCT/JP2021/040235, filed Nov. 1, 2021, which claims priority to JP 2020-184132, filed Nov. 4, 2020, the entire contents of each are incorporated herein by reference.

TECHNICAL FIELD

The present disclosure relates to an image data transmission apparatus, an image data transmission method, a computer program, and a storage medium.

BACKGROUND

Various systems have been proposed to assist a driver in driving vehicles such as automobiles and two wheel vehicles. Such systems include roadside devices with various sensor equipment installed on and around the road. The sensor device is, for example, a camera, a radar, or the like. A server computer (hereinafter referred to as a "server") collects sensor information from the roadside devices, analyzes the collected information, and generates traffic-related information. The traffic-related information is, for example, information related to an accident, traffic congestion, or the like. The server provides this information to the vehicle as dynamic driving assistance information.

It is also proposed that a server collects information not only from a sensor device mounted on a roadside device but also from a sensor device mounted on a vehicle and uses the information for driving assistance. For example, there is a standardization project called 3GPP (Third Generation Partnership Project). This project is intended to promote standardization of third generation mobile communication systems and subsequent generations of mobile communication systems. 3GPP has proposed a standard called cellular V2X. V means a vehicle, and X means various things (everything) other than a vehicle. That is, the V2X includes Vehicle-to-cellular-Network (V2N), Vehicle-to-Vehicle (V2V), Vehicle-to-roadside-Infrastructure (V2I), Vehicle-to-Pedestrian (V2P), and the like. This standard assumes that communication between a vehicle and others is performed by high-speed and low-latency wireless communication such as 4G (fourth generation mobile communication system) and 5G (fifth generation mobile communication system).

The vehicle is basically an organic set of mechanical elements such as an engine, a transmission, an airbag, a brake, and a steering wheel. These have traditionally been controlled by mechanical mechanisms to reflect the driver's operation. However, in recent years, vehicles have become more electronic, and various ECU (Electric Control Unit) for electronically controlling each element are mounted on the vehicles. These ECU include, for example, an engine control ECU, a stop/start control ECU, a transmission control ECU, an airbag control ECU, a power steering control ECU, and a hybrid control ECU. Among these ECU, an ECU for automatic driving attracts attention and many companies compete for development. In addition, a technique of remote monitoring has recently attracted attention.

As its name implies, the autonomous driving ECU aims at automatically driving the vehicle. In the case of a human being, information about the surroundings of the vehicle is collected through five senses to determine how to control the vehicle. However, the vehicle itself does not have such a mechanism for collecting information. Therefore, recent vehicles include a plurality of sensors for collecting information. The sensors include a camera, a LiDAR, a millimeter wave radar, etc. However, in the case of a vehicle, it is not easy to appropriately make a determination for autonomous driving based on information collected from these sensors.

There is a possibility that the traveling speed of the vehicle may be considerably high (fast). Therefore, it is difficult to perform appropriate automatic driving unless the information collected from the in-vehicle sensor is processed at high speed. In order for the vehicle to perform the processing, it is necessary to equip the vehicle with a computer for the processing. However, in the case of a high-performance computer, there are problems of large mounting space, high power consumption, high cost, and high heat generation. Therefore, it is difficult to be mounted on at least a vehicle for general use. Therefore, the following method is currently employed. In this method, the vehicle is equipped with a computer having relatively low performance. The computer transmits the information obtained from the vehicle-mounted sensor to the server in the same manner as the roadside device. The server processes the information at a high speed to generate driving assistance information and distributes it to the vehicle. This also applies to remote monitoring.

However, it is predicted that the amount of data transmitted from the vehicle to the server will increase as the number of vehicles employing automatic driving increases or the performance of the in-vehicle sensor increases in the future. In particular, in the case of a camera, a camera capable of acquiring a color image with high resolution is inexpensive. Therefore, it is expected that more cameras will be mounted on more vehicles in the future. As a result, even if the high-speed wireless communication technology is further developed and widely spread to increase the speed and capacity of the wireless communication line, there is a possibility that the communication traffic exceeds them and the communication capacity becomes tight.

A proposal for solving such a problem is disclosed in the following PTL 1. The system disclosed in PTL 1 relates to communication between a vehicle and an emergency reporting center. When a vehicle transmits imaging images inside and outside the vehicle captured by a camera mounted on the vehicle to an emergency reporting center, the vehicle checks a communication state (for example, communication capacity) and changes a type (for example, moving image or still image)/resolution (for example, low/high)/frame rate (for example, low/medium/high) of image data to be transmitted according to the communication state. Since the transmission content and the frame rate are changed in accordance with the communication state, even when the communication state such as the communication speed varies, the communication capacity is utilized to the maximum extent, and the desired content of the transmission information can be accurately transmitted to the outside.

PRIOR ART DOCUMENT

Patent Literature

PTL 1: Japanese Unexamined Patent Application Publication No. 2008-263580

SUMMARY

Solution to Problem

An image data transmission apparatus according to a first aspect of the present disclosure includes a resolution decision unit configured to decide on a resolution of an image captured by an imaging sensor, in accordance with a combination of a distance between the imaging sensor and an object and a type of an attribute that is a determination target; a transmission data generation unit configured to generate transmission data from data of the image, in accordance with the resolution decided on by the resolution decision unit; and a wireless communication device configured to wirelessly transmit the transmission data that has been generated to a transmission destination.

An image data transmission method according to a second aspect of the present disclosure includes deciding on, with a computer, a resolution of an image captured by an imaging sensor, in accordance with a combination of a distance between the imaging sensor and an object and a type of an attribute that is a determination target; generating, with the computer, transmission data from data of the image, in accordance with the resolution decided on in the deciding on of the resolution; and wirelessly transmitting, with a wireless communication device, the transmission data that has been generated to a transmission destination.

A computer program according to a third aspect of the present disclosure causes a computer to be connected to an imaging sensor, a ranging sensor, and a wireless communication device to function as a resolution decision unit configured to decide on a resolution of an image captured by the imaging sensor, in accordance with a combination of a distance between the imaging sensor and an object and a type of an attribute that is a determination target; a transmission data generation unit configured to generate transmission data from data of the image, in accordance with the resolution decided on by the resolution decision unit; and a transmission unit configured to transmit the transmission data that has been generated to a transmission destination via the wireless communication device.

A computer-readable storage medium according to a fourth aspect of the present disclosure stores the computer program described above.

The above and other objects, features, aspects and advantages of the present invention will become apparent from the following detailed description of the invention taken in conjunction with the accompanying drawings.

BRIEF DESCRIPTION OF THE DRAWINGS

FIG. 7 is a diagram showing a detection attribute output table.

DETAILED DESCRIPTION

Figure 1:
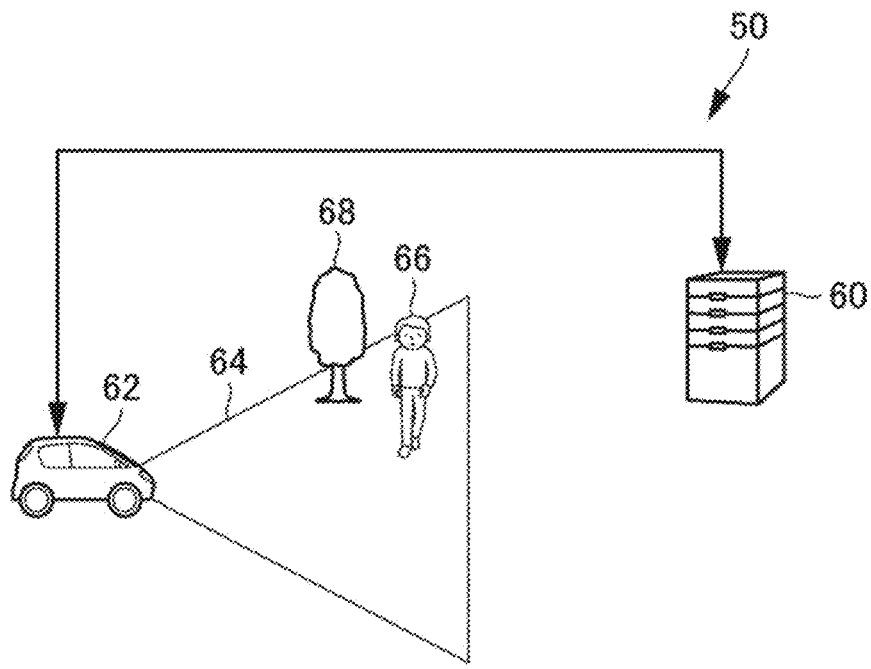
FIG. 1 is a schematic diagram showing a configuration of a driving assistance system.

Problems to be Solved by the Disclosure

In the technique disclosed in PTL 1, even when there is a change in the communication state, the amount of transmission information is changed in accordance with the communication capacity. However, from the viewpoint of a server in a position to receive this information, it is inconvenient to be transmitted a large amount of information which is not useful for the driving assistance even if the communication state is good. It is also inconvenient that a large amount of information which is useful for normal driving assistance but is not used in driving assistance processing performed by a certain server is transmitted. That is, it cannot be said that the technique disclosed in PTL 1 makes the most effective use of the communication capacity in order to transmit information effective for the server.

An object of the present disclosure is to provide an image data transmission apparatus, an image data transmission method, a computer program, and a storage medium capable of transmitting and receiving information effective for driving assistance by effectively using a communication capacity.

Description of Embodiments of Present Disclosure

In the following description and drawings, the same parts are provided with the same reference numerals. Therefore, a detailed description thereof will not be repeated.

(1) An image data transmission apparatus according to a first aspect of the present disclosure includes a resolution decision unit configured to decide on a resolution of an image captured by an imaging sensor, in accordance with a combination of a distance between the imaging sensor and an object and a type of an attribute that is a determination target; a transmission data generation unit configured to generate transmission data from data of the image, in accordance with the resolution decided on by the resolution decision unit; and a wireless communication device configured to wirelessly transmit the transmission data that has been generated to a transmission destination.

The resolution decision unit decides the resolution of the image according to a combination of the distance between the imaging sensor and the object and the type of the attribute that is the determination target. The data amount of the transmission data varies as a function of the resolution of the image data. Therefore, in accordance with the combination of the distance and the type of attribute, the transmission destination device can obtain transmission data of an appropriate data amount from the image data transmission apparatus in order to determine the attribute value that is the determination target. As a result, the image data transmission apparatus can transmit and receive information effective for the driving assistance by effectively using the communication capacity.

(2) The image data transmission apparatus may further include a target attribute reception unit configured to receive the attribute that is the determination target from the transmission destination; and a target attribute storage unit configured to store the attribute that is the determination target.

The target attribute reception unit receives the attribute type that is the determination target, and the target attribute storage unit stores the attribute type. The resolution of the image is determined by using the attribute type of the determination target. A device that performs processing for driving assistance transmits an attribute serving as a determination target to an image data transmission apparatus according to processing performed by the device. The image data transmission apparatus transmits image data of an appropriate data amount corresponding to the type of the attribute serving as the determination target to this device. As a result, the transmission destination device can obtain an image with an appropriate resolution for determining the attribute or the attribute value of the determination target by effectively using the communication capacity.

(3) The image data transmission apparatus may further include a resolution table reception unit configured to receive, from the transmission destination, a resolution selection table indicating a correspondence relationship between the resolution of the image and the combination of the distance between the imaging sensor and the object and the type of the attribute that is the determination target. The resolution decision unit may include a resolution identification unit configured to identify, from the resolution selection table, the resolution corresponding to the combination of the distance between the imaging sensor and the object and the type of the attribute that is the determination target.

The resolution selection table is transmitted from the transmission destination device to the image data transmission apparatus. The image data transmission apparatus may appropriately determine the resolution of the image based on a combination of the distance between the imaging sensor and the object and the type of the attribute that is the determination target using the resolution selection table. Therefore, in the image data transmission apparatus, the resolution of the image can be determined by a simple process.

(4) The image data transmission apparatus may further include a communication state measurement unit configured to measure an available communication band for wireless communication. The transmission data generation unit may include a first determination unit configured to determine whether a transmission data amount in transmission of the data of the image to the transmission destination at a first transmission frame rate is greater than the available communication band measured by the communication state measurement unit, and a data reduction unit configured to reduce a data amount of the image in response to determination by the first determination unit being positive.

Even if the resolution of the image to be transmitted is appropriately determined, if the transmission data amount is larger than the available communication band, the transmission data cannot be transmitted to the transmission destination in a timely manner. However, if the data amount of the transmission data is reduced, the transmission data can be transmitted to the transmission destination device. The transmission destination device determines an attribute or an attribute value within a possible range from the received transmission data and can use the attribute or the attribute value for driving assistance.

(5) The data reduction unit may include a frame rate change unit configured to change a transmission frame rate of the data of the image to a second transmission frame rate smaller than the first transmission frame rate within a range permissible in communication with the transmission destination, in response to the determination by the first determination unit being positive.

By reducing the transmission frame rate of the transmission data, it is possible to reduce the transmission data amount per unit time while maintaining the resolution of the image. As a result, the transmission destination device can determine an appropriate attribute or attribute value while making maximum use of the communication capacity.

(6) The data reduction unit may include an image reconfiguration unit configured to reconfigure the image to a reduced-size image having a smaller data amount, in response to the determination by the first determination unit being positive.

When the data amount of the transmission data is still large, the image data is reconstructed into a reduced-size image having a smaller data amount. As a result, the data amount of the image data is reduced. If the reduced-size image includes an image of an object or person whose attribute is to be determined, the attribute can be determined. As a result, it is possible to perform driving assistance by making the most of the image while making the most of the communication capacity.

(7) The data reduction unit may further include a resolution reduction unit configured to reduce a data amount of the image such that the data of the image is transmittable to the transmission destination with the communication band, in response to data of the reconfigured image obtained by the image reconfiguration unit not being transmittable with the available communication band, and an attribute information addition unit configured to add attribute information for identifying an attribute that can be determined based on the data of the image having the reduced data amount, to the data of the image having the reduced data amount.

If the available communication band is small, the image cannot be transmitted unless the resolution of the image is considerably lowered. Therefore, it is difficult for the transmission destination to determine the attribute value of the determination target from the image. However, there is also an attribute that can be determined from a low-resolution image. The transmission destination device can determine the attribute of the object or person in the image to the extent possible based on the attribute information attached to the data of the image. It is possible to avoid a wasteful process of trying to determine an attribute that cannot be determined with the received image data. As a result, it is possible to perform processing for driving assistance within a possible range by effectively using the calculation resource of the transmission destination device while maximally using the communication capacity.

(8) The data reduction unit may include a resolution conversion unit configured to covert the data of the image to reduce the resolution of the image until the image has a data amount transmittable at the first transmission frame rate, in response to the determination by the first determination unit being positive, and an attribute information addition unit configured to add attribute information for identifying an attribute that can be determined based on the converted data of the image obtained by the resolution conversion unit, to the converted data of the image.

If the available communication band is small, the image cannot be transmitted at the first transmission frame rate unless the resolution of the image is lowered. Therefore, it is difficult for the transmission destination to determine the attribute value of the determination target from the image. However, there is also an attribute that can be determined from a low-resolution image. The transmission destination device can determine the attribute value of the object or person in the image to the extent possible based on the attribute information attached to the data of the image. It is possible to avoid unnecessary processing of trying to determine an attribute value that cannot be determined from the received image data. As a result, it is possible to perform processing for driving assistance within a possible range by effectively using the calculation resource of the transmission destination device while maximally using the communication capacity.

(9) An image data transmission method according to a second aspect of the present disclosure includes deciding on, with a computer, a resolution of an image captured by an imaging sensor, in accordance with a combination of a distance between the imaging sensor and an object and a type of an attribute that is a determination target; generating, with the computer, transmission data from data of the image, in accordance with the resolution decided on in the deciding on of the resolution; and wirelessly transmitting, with a wireless communication device, the transmission data that has been generated to a transmission destination.

According to a combination of the distance between the imaging sensor and the object and the type of the attribute that is the determination target, the resolution of the image data is determined in the step of determining the resolution. Since the data amount of the transmission data changes as a function of the resolution of the image data, it is possible to obtain transmission data having an appropriate data amount for determining the attribute value as the determination target in accordance with the combination of the distance and the type of the attribute. As a result, it is possible to transmit and receive information effective for driving assistance by effectively using the communication capacity.

(10) A computer program according to a third aspect of the present disclosure causes a computer to be connected to an imaging sensor, a ranging sensor, and a wireless communication device to function as a resolution decision unit configured to decide on a resolution of an image captured by the imaging sensor, in accordance with a combination of a distance between the imaging sensor and an object and a type of an attribute that is a determination target; a transmission data generation unit configured to generate transmission data from data of the image, in accordance with the resolution decided on by the resolution decision unit; and a transmission unit configured to transmit the transmission data that has been generated to a transmission destination via the wireless communication device.

When the computer program is executed by the computer, the resolution of the image data is determined by the resolution decision unit according to a combination of the distance between the imaging sensor and the object and the type of the attribute that is the determination target. Since the transmission data amount changes as a function of the resolution of the image data, it is possible to obtain an image having an appropriate data amount for determining the attribute value that is the determination target in accordance with a combination of the distance and the type of the attribute. As a result, it is possible to transmit and receive information effective for driving assistance by effectively using the communication capacity.

(11) A computer-readable storage medium according to a fourth aspect of the present disclosure stores the computer program described above.

When the computer reads and executes the computer program, the resolution of the image data is determined by the resolution decision unit in accordance with a combination of the distance between the imaging sensor and the object and the type of the attribute that is the determination target. Since the transmission data amount changes as a function of the resolution of the image data, it is possible to obtain an appropriate image for determining the attribute value that is the determination target in accordance with the combination of the distance and the type of attribute. As a result, it is possible to transmit and receive information effective for driving assistance by effectively using the communication capacity.

The above and other objects, features, aspects and advantages of the present disclosure will become apparent from the following detailed description of the present disclosure taken in conjunction with the accompanying drawings.

Advantageous Effects of Disclosure

As described above, according to the present disclosure, it is possible to provide an image data transmission apparatus, an image data transmission method, a computer program, and a storage medium capable of transmitting and receiving information effective for driving assistance by effectively using a communication capacity.

DETAILS OF EMBODIMENTS OF PRESENT DISCLOSURE

Specific examples of an image data transmission apparatus, an image data transmission method, a computer program, and a storage medium according to embodiments of the present disclosure will be described below with reference to the drawings. The present disclosure is not limited to these examples, but is defined by the scope of the claims, and is intended to include all modifications within the meaning and scope equivalent to the scope of the claims.

First Embodiment

<Configuration>
<<Conceptual Description>>

FIG. 1 shows a conceptual configuration of a traffic assistance system 50. Referring to FIG. 1, traffic assistance system 50 includes an edge server 60 for performing processing for driving assistance, a plurality of vehicles such as a vehicle 62, and a roadside device (not shown). Vehicle 62 has one or more sensors. These sensors include a camera, which is a type of imaging sensor, and a LiDAR and millimeter wave radar, which are types of ranging sensors. Vehicle 62 may have one or more of these various sensors. In the following embodiments, a case where one camera, one LiDAR, and one millimeter wave radar exist will be described. Even in the case there are more than one of each of these sensors, the present disclosure can be realized by a configuration similar to that described in the following description.

Figure 2:
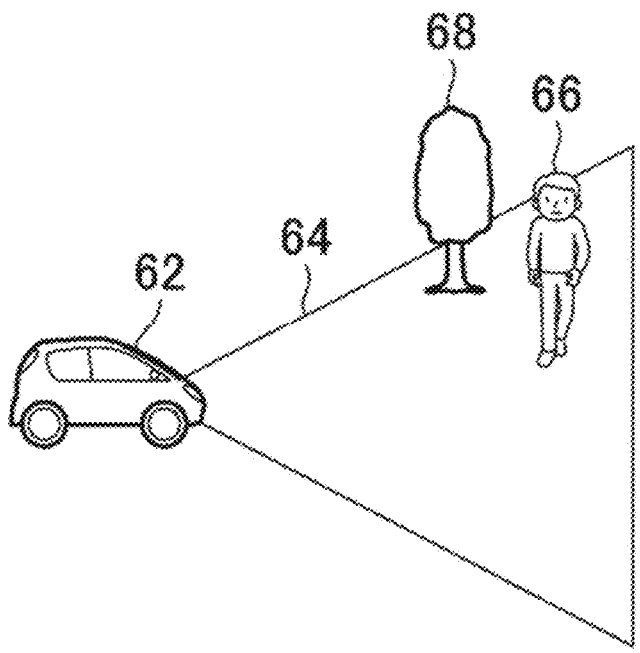
FIG. 2 is a schematic diagram showing a situation where a vehicle images a nearby pedestrian.

A traffic participant such as a pedestrian 66 and surrounding objects such as a tree 68 may enter an imaging region 64 of the camera of vehicle 62. For example, as shown in FIG. 2, consider a case where pedestrian 66 crosses in front of vehicle 62 in a region relatively close to vehicle 62 in imaging region 64.

Figure 3:
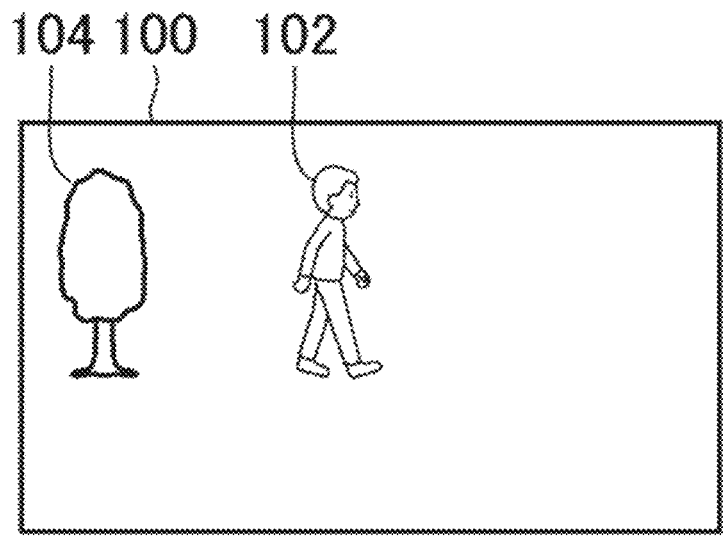
FIG. 3 is a schematic diagram showing an image captured by the vehicle in the situation shown in FIG. 2.

FIG. 3 shows an example of an image 100 captured with the camera of vehicle 62 in this case. As shown in FIG. 3, image 100 includes an image 102 of pedestrian 66 shown in FIG. 2 and a tree image 104 which is an image of tree 68 shown in FIG. 2. In the example shown in FIG. 3, tree image 104 on the left side and image 102 are approximately the same size.

Figure 4:
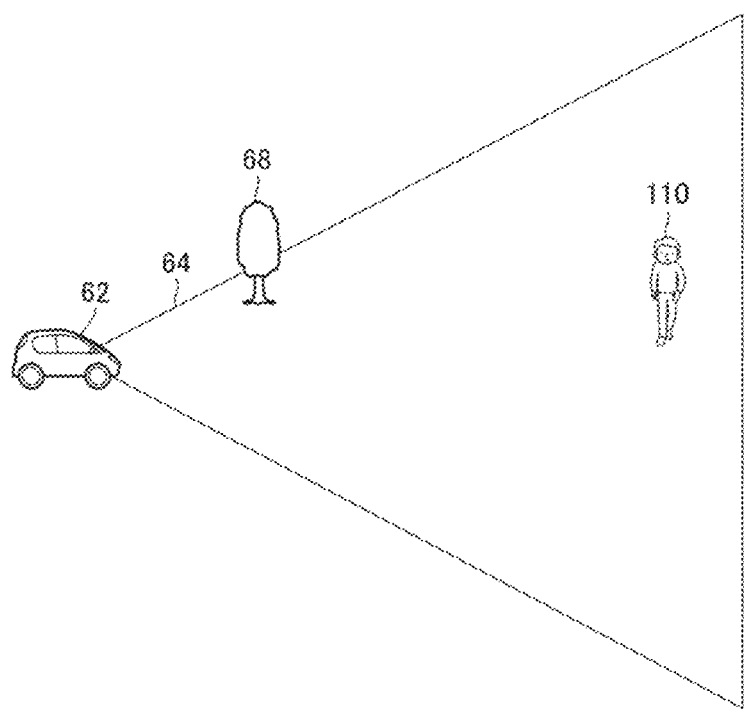
FIG. 4 is a schematic diagram showing a situation in which a vehicle images a distant pedestrian.
Figures 5, 6:
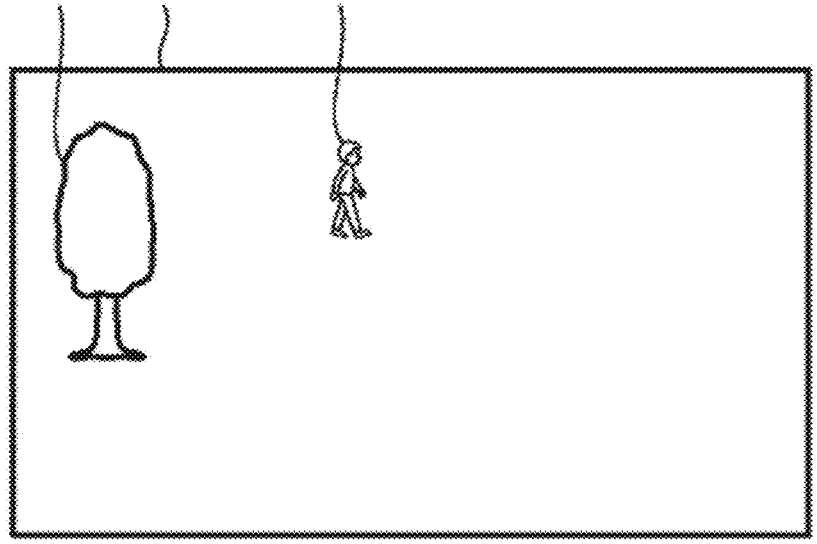
FIG. 5 is a schematic diagram showing an image captured by the vehicle in the situation shown in FIG. 4.
FIG. 6 is a diagram showing a resolution selection table.

On the other hand, referring to FIG. 4, consider a case where the camera of vehicle 62 captures an image of a pedestrian 110 located within imaging region 64 but at a position farther than pedestrian 66 of FIG. 3, i.e., at a position farther from tree 68. In this case, as shown in FIG. 5, an image 122 of pedestrian 110 becomes small in obtained an image 120. For example, image 122 is expected to be much smaller compared to tree image 104 on the left side of image 102 compared to the case of FIG. 3.

Thus, the larger the distance between the object and the camera, the smaller its image in the captured image. Specifically, the area of the object on the image is inversely proportional to the square of the distance between the object and the camera. That is, the number of pixels in the vertical and horizontal directions is reduced. Then, the following problems occur.

For example, assume that edge server 60 shown in FIG. 1 determines the attribute value of an object such as a pedestrian with image recognition. "Attribute" refers to "characteristics and properties of a thing" (Iwanami Shoten, Kojienan, 6th edition). For example, in the case of a person, "height" and "weight" may be considered as typical attributes. Values unique to each person (165 cm, 180 cm, 45 kg, 67 kg, etc.) are assigned to these attributes. That is, in this specification, "attribute" refers to a feature that is considered to be common to objects, and even the same attribute has different values depending on the object. In this specification, "determining an attribute" is used to mean "determining (or estimating) an attribute value".

In this specification, five types of attributes are considered: simple attribute, detailed attribute, behavioral attribute, and body orientation and face orientation in the case of a person. In this embodiment, each of these attributes is information indicating a feature or property of an object which is a traffic participant such as a vehicle or a pedestrian, and is information to be extracted from an image as information effective for driving assistance.

The simple attribute means a rough attribute that can be recognized even from a distance, for example, an attribute indicating a type of an object. For example, a pedestrian, an automobile, a two wheel vehicle, a guardrail, and the like are distinguished. The detailed attribute is a feature that is more detailed than the type of the target in many cases, and is an attribute that cannot be determined unless the target is approached. For example, in the case of an automobile, the distinction is made between a truck and a passenger car, and further between a large size, a medium size, a small size, and the like, and in the case of a person, the distinction is made between an adult, a child, an elderly person, and the like. The behavioral attribute is not related to an appearance such as a type of an object, but is an attribute indicating a behavior of an opponent. For example, in the case of an automobile and a person, the information includes a moving speed, a moving direction, and the like. These attributes require detailed attributes and are further determined based on their time-series information. Therefore, the behavioral attribute can be a more detailed feature than the detailed attribute. The last two attributes, body orientation and face orientation, are both person-specific attributes. These are useful for predicting future behavior of a person. The body orientation cannot be determined unless not only the movement of the object but also the details of the image are known. Therefore, the body orientation can be a more detailed attribute than the behavioral attribute. Furthermore, the face is only a part of the body. Therefore, the face orientation can be a more detailed attribute than the body orientation.

As described above, the attribute of the object is information required for traffic assistance and has a different level of detail. In this specification, the degree of detail of the attribute of the object is referred to as a detail level of the attribute, and the value of the attribute is referred to as an attribute value. In the following description, determining an attribute value may be simply referred to as determining an attribute.

When a person drives an automobile, these attributes are instantaneously determined by the person on the basis of information input through five senses. A person can easily make such a determination. However, in a case where automated driving is performed under the control of a computer using only sensor data without using human sense, or remote control is performed, it is not so easy to determine these attribute values.

In general, the number of pixels of the image required to determine the attribute value of the object varies depending on the level of detail of the attribute. That is, in the case of a simple and rough attribute such as the simple attribute, the attribute value can be determined even if the image of the object consists of a relatively small number of pixels. However, it cannot be determined that the image of the object is not composed of a large number of pixels with respect to particularly detailed attributes such as the body orientation and the face orientation of the person. Therefore, for example, when the pedestrian is far from the camera, it is difficult to determine the attribute value such as the body orientation or the face orientation from the image of the object unless the image with high resolution is used.

However, in the case of an image having a high resolution, there is a problem in that the data amount is large and the transmission data amount transmitted from the vehicle to the edge server increases. If the data amount is large, not only transmission takes time but also wireless communication is congested and the edge server may not be able to quickly collect necessary information. Therefore, it is not desirable to use only high-resolution image data as image data to be transmitted to the edge server. If the edge server performs processing that does not need to obtain such detailed information, sending an image with high resolution is not efficient in the first place.

Therefore, in this disclosure, when an image is transmitted to an edge server, attention is paid to a distance between an imaging target and a camera (vehicle). That is, when the distance between the imaging target and the camera is large, the object image becomes small. Therefore, the resolution of the image transmitted from the vehicle to the edge server is increased. Conversely, when the distance between the imaging target and the camera is short, the resolution of the image transmitted from the vehicle to the edge server is lowered.

By adjusting the resolution of the image in this way, the edge server can obtain the attribute with the same level of detail regardless of the distance between the imaging target and the camera mounted on the vehicle. Also in this disclosure, the resolution of the image is adjusted according to the level of detail of the attribute that the server is trying to determine. Assuming that the degree of detail is determined by the type of attribute, it can also be considered that the resolution of the image to be transmitted to the edge server is adjusted in accordance with the type of attribute to be determined by the edge server based on the image.

For this purpose, a resolution selection table 150 shown in FIG. 6 is used in this embodiment. Resolution selection table 150 indicates a correspondence relationship between a combination of a distance between a camera and an object and a type of an attribute to be determined from the object, and a resolution of an image predetermined so that the attribute value of the object can be determined in the combination. Resolution selection table 150 shown in FIG. 6 is a table in which the horizontal axis represents the attribute to be determined by the edge server, the vertical axis represents the distance between the object and the camera, and the cell at the intersection of them represents the minimum resolution of the image required to determine the attribute value of the object using the image of the object located at the distance. On the horizontal axis of resolution selection table 150, attributes are arranged such that the degree of detail increases from left to right. On the other hand, the distance increases from top to bottom on the vertical axis. Also, "5m" on the vertical axis indicates that the distance is greater than 0 m and less than or equal to 5 m. Similarly, "150m" refers to the previous row and indicates that the distance is greater than 50 m and less than or equal to 150 m. "150m-" in the last row indicates that the distance exceeds 150 m.

In FIG. 6, "HD" stands for "High Definition", "FHD" stands for "Full High Definition", and "QHD" stands for "Quad High Definition". "4K" means a resolution in which the number of horizontal pixels is about 4000.

Using resolution selection table 150, given the distance between the object and the camera and the attribute that the edge server wants to determine for the object, the minimum resolution required to send the image to the edge server is determined. For example, referring to FIG. 6, it is assumed that the distance between the object and the camera is greater than 15 m and less than or equal to 50 m, and the attribute to be determined by the edge server is the body orientation of the person. The minimum resolution required at this time is "FHD" by the cell in which the horizontal axis is "body orientation" and the vertical axis is "50m" in resolution selection table 150.

If the object is far from the camera and its image is small, the resolution is increased as much as necessary so that the edge server can determine the attribute value to be determined for the object. When the object is close to the camera and its image is relatively large, the resolution is set as low as possible within a range in which the attribute to be determined for the object by the edge server can be determined. In this way, when the edge server tries to determine the attribute value of the object, if a detailed image is required for the determination, the resolution is set relatively high, and if a simpler image is sufficient, the resolution is set low.

As described above, by transmitting the minimum necessary information from the vehicle to the edge server in accordance with the attribute to be determined by the edge server, appropriate processing can be performed in the edge server while saving the communication capacity.

On the other hand, there may be a case where the image cannot be transmitted to the edge server at the resolution indicated in resolution selection table 150 due to a limitation of communication capacity, a limitation of camera performance, or the like. In such a case, in this embodiment, an image having a resolution lower than the resolution determined by resolution selection table 150 is transmitted to the edge server. At the same time, information on attributes that can be determined at the resolution is also transmitted from the vehicle to the edge server. In this way, the edge server can know the attribute that can be determined using the received image, and can effectively use the image for driving assistance. Therefore, in this embodiment, when image data is transmitted from the vehicle to the edge server, a detection attribute output table 160 shown in FIG. 7 is used.

Referring to FIG. 7, in detection attribute output table 160, the horizontal axis represents the resolution of the image, the vertical axis represents the distance, and the cell at the position where the resolution and the distance intersect each other represents the most detailed attribute determinable at the resolution and the distance in the form of a table. The meaning of the vertical axis is the same as in FIG. 6.

For example, referring to FIG. 7, if the distance is greater than 15 m and less than or equal to 50 m and the resolution is available only up to FHD, the attribute determinable by the edge server is up to 3 (body orientation). That is, the edge server can determine the simple attribute, the detailed attribute, the behavioral attribute, and the body orientation of the object. However, the face orientation cannot be determined. Similarly, when the distance is greater than 50 m and less than or equal to 150 m and only HD is available, the attribute that can be determined by the edge server is only the simple attribute. When the distance exceeds 150 m, there is no attribute that can be determined by the edge server if the resolution is HD. The edge server can determine the attribute up to the detailed attribute if the resolution is FHD, up to the body orientation if the resolution is QHD, and up to the face orientation if the resolution is 4K.

Detection attribute output table 160 shown in FIG. 7 can be calculated from resolution selection table 150 shown in FIG. 6.

<<Edge Server 60>>

Figure 8:
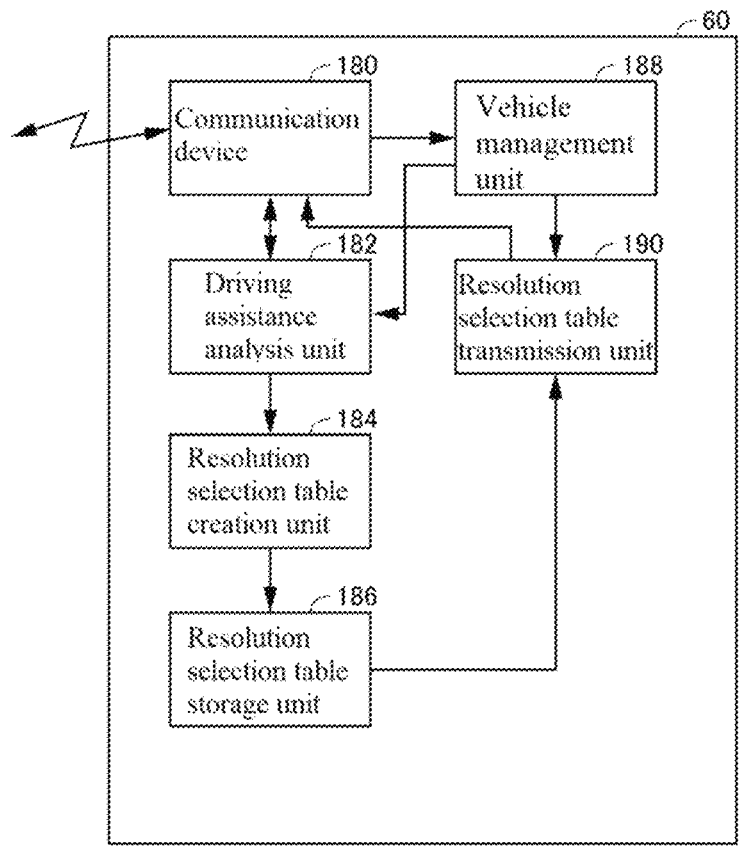
FIG. 8 is a functional block diagram of the edge server of a first embodiment.

FIG. 8 shows a functional block diagram of edge server 60. Referring to FIG. 8, edge server 60 includes a communication device 180 for communicating with a vehicle and a roadside device (hereinafter referred to as "vehicle or the like") with wireless or wired communication. Edge server 60 further includes a driving assistance analysis unit 182 which is connected to communication device 180, generates information for driving assistance based on sensor data including image data received from the vehicle or the like by communication device 180, and transmits the information to each vehicle or the like. Edge server 60 further includes a vehicle management unit 188 for storing and managing vehicle information including a vehicle type, a position, a moving speed, an arrangement state of a sensor, and the like of each vehicle received by communication device 180 from the vehicle or the like. Driving assistance analysis unit 182 communicates with each vehicle or the like based on the vehicle information stored in vehicle management unit 188.

Edge server 60 further includes a resolution selection table creation unit 184 connected to driving assistance analysis unit 182 for creating resolution selection table 150 shown in FIG. 6. When creating resolution selection table 150, resolution selection table creation unit 184 calculates the resolution of the image necessary for determining each attribute based on the constraint condition when driving assistance analysis unit 182 analyzes the sensor data (in particular, image data). Edge server 60 further includes a resolution selection table storage unit 186 for storing resolution selection table 150 created by resolution selection table creation unit 184. Edge server 60 further includes a resolution selection table transmission unit 190 for transmitting resolution selection table 150 via communication device 180 to vehicles that have not yet transmitted latest resolution selection table 150 based on the vehicle information stored in vehicle management unit 188. At this time, resolution selection table transmission unit 190 selects a transmission destination vehicle from among vehicles specified by the vehicle information stored in vehicle management unit 188.

<<Vehicle 62>>

Figure 9:
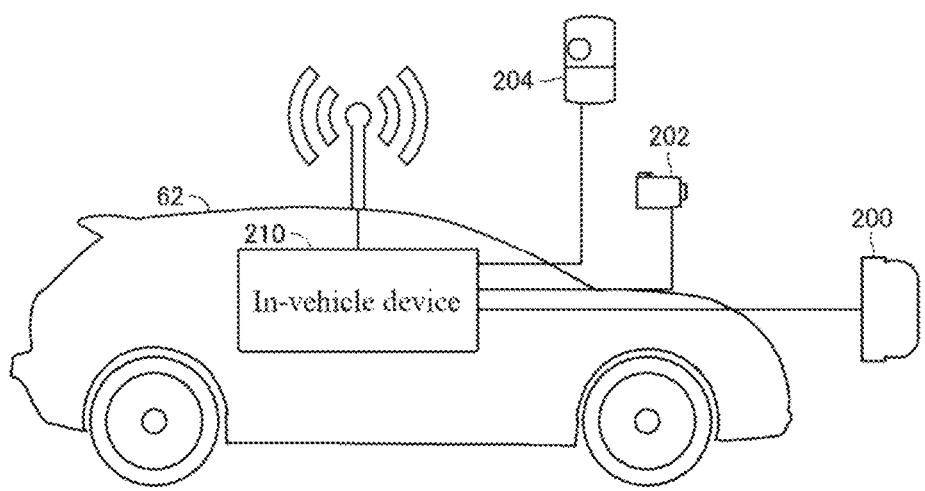
FIG. 9 is a block diagram showing a schematic configuration of the vehicle of the first embodiment.

FIG. 9 illustrates a functional block diagram of the portion of vehicle 62 relevant to this disclosure. Referring to FIG. 9, vehicle 62 includes a millimeter wave radar 200 which is a ranging sensor, a camera 202 which is an imaging sensor, and a LiDAR 204 which is a ranging sensor. Vehicle 62 further includes an in-vehicle device 210 that receives sensor data from these sensors and transmits the sensor data to edge server 60 with wireless communication, receives information for driving assistance from edge server 60 with wireless communication, and performs processing of driving assistance.

Figure 10:
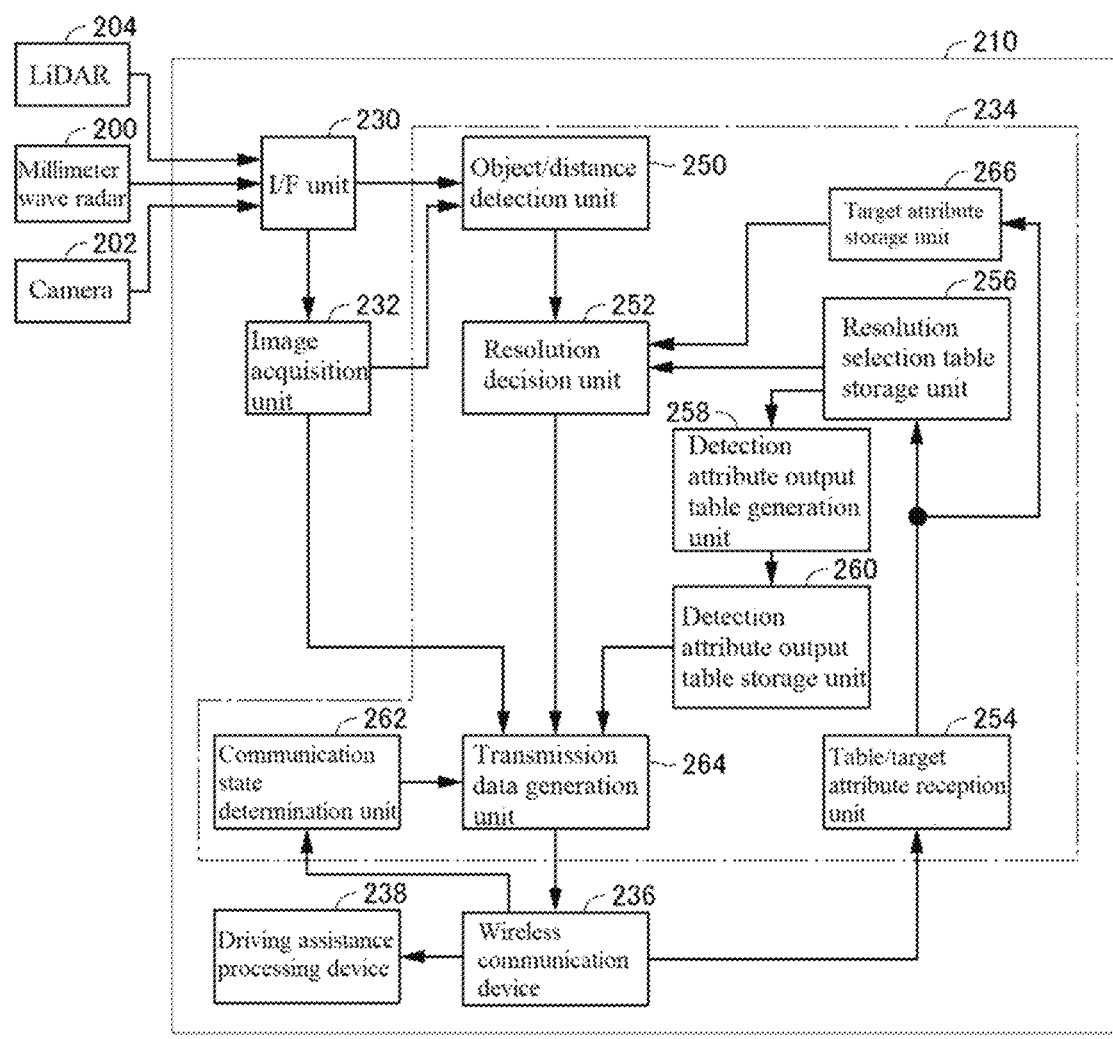
FIG. 10 is a functional block diagram of an in-vehicle device.

Referring to FIG. 10, in-vehicle device 210 includes an OF unit 230 connected to millimeter wave radar 200, camera 202, and LiDAR 204 to receive sensor data therefrom and convert the sensor data into a digital format that can be processed in in-vehicle device 210. Note that I/F means Interface. In-vehicle device 210 further includes an image acquisition unit 232 for acquiring an image captured by camera 202 via I/F unit 230. In-vehicle device 210 further includes a wireless communication device 236 for performing wireless communication with edge server 60. In-vehicle device 210 further includes a driving assistance processing device 238 that performs processing for driving assistance of the driver based on the driving assistance information received by wireless communication device 236 from edge server 60.

In-vehicle device 210 further includes an image data transmission unit 234 for transmitting, to edge server 60 via wireless communication device 236, transmission data obtained by converting the image data to a minimum resolution required to determine the attribute based on the distance between the object detected in the image data and camera 202 and the attribute to be determined by edge server 60. In this case, image data transmission unit 234 calculates the distance between the position of the real object detected in the image data and camera 202 based on the distance measurement data (point cloud in the case of LiDAR 204) to the target object received from millimeter wave radar 200 and LiDAR 204 through I/F unit 230 and the image data received from camera 202 by image acquisition unit 232. In this calculation, if camera 202 and LiDAR 204 are arranged close to each other, the distance measurement data from LiDAR 204 to the object is used as it is. When the distance between camera 202 and LiDAR 204 is not negligible compared to the distance between camera 202 and the object, the following processing is performed. That is, the distance between camera 202 and LiDAR 204, the distance between LiDAR 204 and the object, and the distance between a line segment connecting camera 202 and LiDAR 204 and a half-line extending from LiDAR 204 toward the object are used to calculate the distance between camera 202 and the object using the principle of triangulation.

Image data transmission unit 234 includes a table/target attribute reception unit 254 for receiving information indicating resolution selection table 150 and a target attribute, which is an attribute to be determined by edge server 60, from edge server 60 through wireless communication device 236. Table/target attribute reception unit 254 receives resolution selection table 150 when vehicle 62 communicates with edge server 60 for the first time in this embodiment although a timing for table/target attribute reception unit 254 to receive resolution selection table 150 is not particularly limited thereto. The target attribute is also not particularly limited, and may be received when vehicle 62 first communicates with edge server 60, or may be received from edge server 60 at any time. Image data transmission unit 234 further includes a resolution selection table storage unit 256 for storing resolution selection table 150 received by table/target attribute reception unit 254. Image data transmission unit 234 further includes a target attribute storage unit 266 for storing the target attribute received by table/target attribute reception unit 254 and providing the target attribute to a request source in response to a request to read the target attribute. Edge server 60 may transmit resolution selection table 150 to each vehicle every time resolution selection table 150 is changed.

Image data transmission unit 234 further includes an object/distance detection unit 250 for calculating an object in the image and a distance from the camera to the object using the outputs from millimeter wave radar 200 and LiDAR 204 and the image data from camera 202. At this time, the object/distance detection unit 250 receives outputs of millimeter wave radar 200 and LiDAR 204 via I/F unit 230, and receives image data from camera 202 via image acquisition unit 232. Image data transmission unit 234 further includes a detection attribute output table generation unit 258 for generating detection attribute output table 160 from resolution selection table 150 in response to resolution selection table 150 being stored in resolution selection table storage unit 256, and a detection attribute output table storage unit 260 for storing detection attribute output table 160 generated by detection attribute output table generation unit 258.

Image data transmission unit 234 further includes a resolution decision unit 252 for deciding the resolution of the image to be transmitted to edge server 60 based on the distance detected for each object in the image by object/distance detection unit 250 and the target attribute stored in target attribute storage unit 266. Resolution decision unit 252 then determines the resolution of the image for each image by looking up resolution selection table 150 stored in resolution selection table storage unit 256 based on the distance detected for each object in the image and the target attribute. Image data transmission unit 234 further includes a communication state determination unit 262 for measuring an available communication band for wireless communication between wireless communication device 236 and edge server 60. Image data transmission unit 234 further includes a transmission data generation unit 264 for generating an image for transmission obtained by changing the resolution of the image acquired by image acquisition unit 232 based on the resolution determined by resolution decision unit 252 and the communication state determined by communication state determination unit 262 and transmitting the image for transmission to vehicle 62 via wireless communication device 236. Transmission data generation unit 264 operates as described above when the image having a resolution necessary and sufficient to determine the target attribute can be transmitted to vehicle 62. However, when the image with the necessary resolution cannot be transmitted, transmission data generation unit 264 refers to detection attribute output table storage unit 260 and acquires information for specifying the attribute that can be determined with the usable resolution. Transmission data generation unit 264 further adds this information to the image for transmission and transmits it to vehicle 62 via wireless communication device 236.

<<Timing Diagram>>

Figure 11:
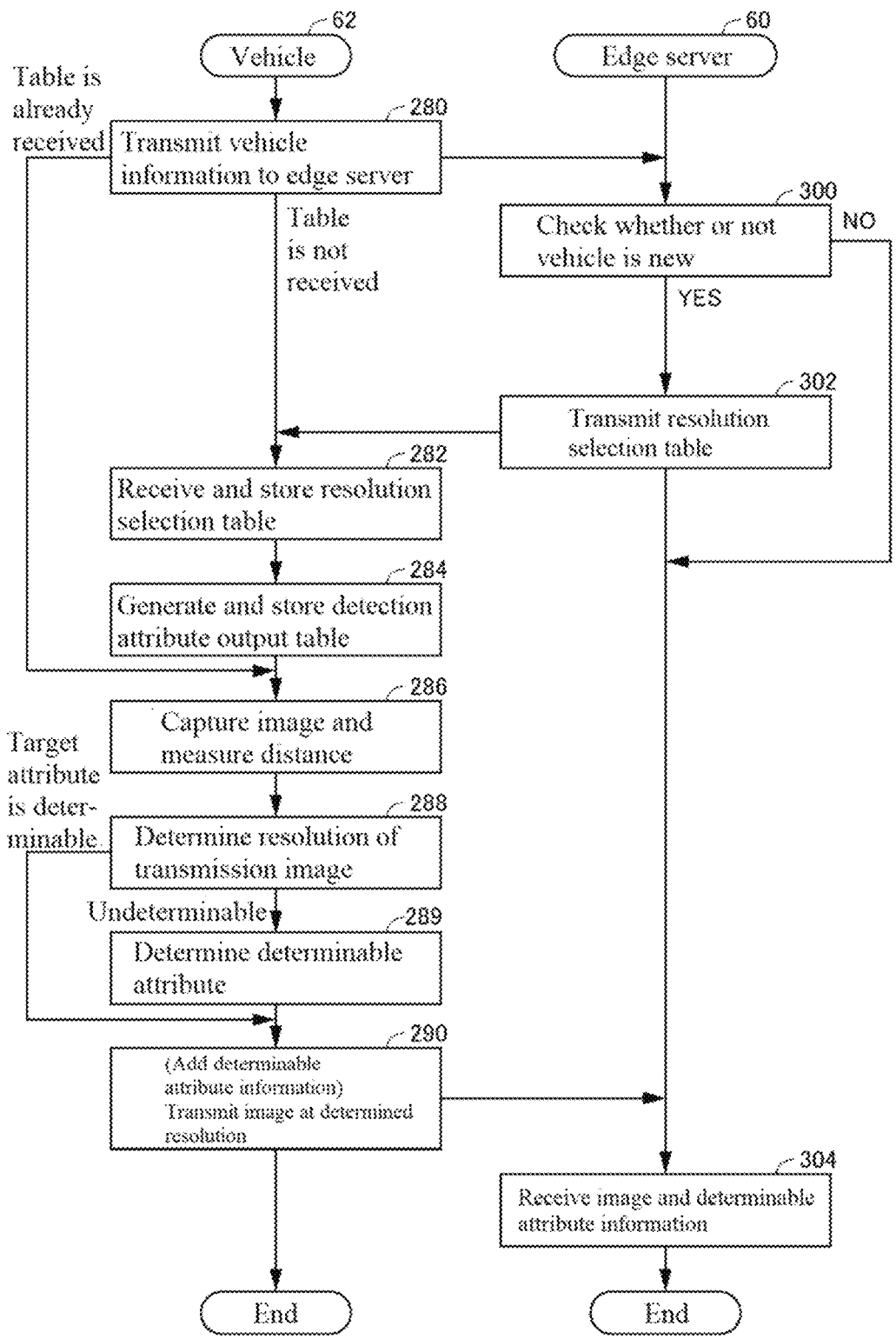
FIG. 11 is a sequence diagram showing communication between an edge server and a vehicle.

The communication timing between edge server 60 and vehicle 62 is shown in FIG. 11. Referring to FIG. 11, if vehicle 62 has not received resolution selection table 150 from edge server 60 in a step 280, vehicle 62 transmits vehicle information to edge server 60. In a step 300, edge server 60 compares the received vehicle information with the vehicle information stored therein to determine whether or not vehicle 62 is a new vehicle. If vehicle 62 is a new vehicle, edge server 60 transmits resolution selection table 150 held by itself and an attribute (target attribute) determined based on the image from vehicle 62 to vehicle 62 in a step 302. If vehicle 62 is a vehicle corresponding to the vehicle information already held by edge server 60, edge server 60 skips the processing of step 302. In step 280, if vehicle 62 has already received resolution selection table 150 from edge server 60, vehicle 62 does not transmit the vehicle information to edge server 60. In this case, vehicle 62 executes a step 286 to be described later without executing a step 282 and a step 284.

Vehicle 62 receives resolution selection table 150 and the target attribute transmitted from edge server 60 in step 282, and stores them in resolution selection table storage unit 256 and target attribute storage unit 266 shown in FIG. 10. When vehicle 62 receives and stores resolution selection table 150, vehicle 62 generates detection attribute output table 160 from resolution selection table 150 in step 284. Vehicle 62 stores detection attribute output table 160 in detection attribute output table storage unit 260 of FIG. 10. When vehicle 62 does not receive the target attribute and resolution selection table 150 from edge server 60 within a predetermined time, vehicle 62 does not execute step 282 and step 284, and executes next step 286.

Subsequently, vehicle 62 captures the image using camera 202 shown in FIG. in step 286. In step 286, object/distance detection unit 250 detects objects from the captured image and measures the distance from camera 202 to each object using the outputs of LiDAR 204 and millimeter wave radar 200. In a step 288, the resolution of the transmission image is determined.

If the resolution determined in step 288 is not the resolution required to determine the attribute value of the target, vehicle 62 determines a determinable attribute in a step 289. Otherwise, vehicle 62 does not execute the process of step 289. Finally, vehicle 62 transmits the image to edge server 60. At this time, vehicle 62 converts the image into the resolution determined in step 288 in a step 290 if necessary. When the process of step 289 is executed, vehicle 62 adds attribute information for specifying an attribute determinable from the image to the image. Edge server 60 receives this image in a step 304. If the resolution of the received image is sufficient to determine the attribute value of the target, edge server 60 performs processing for determining the attribute value of the target from the received image. When the resolution of the received image is not sufficient to determine the attribute value of the target, edge server 60 determines the attribute value of each object determined by the attribute information added to the image, and uses it for driving assistance.

<<Program for Generating Detection Attribute Output Table 160>>

Figure 12:
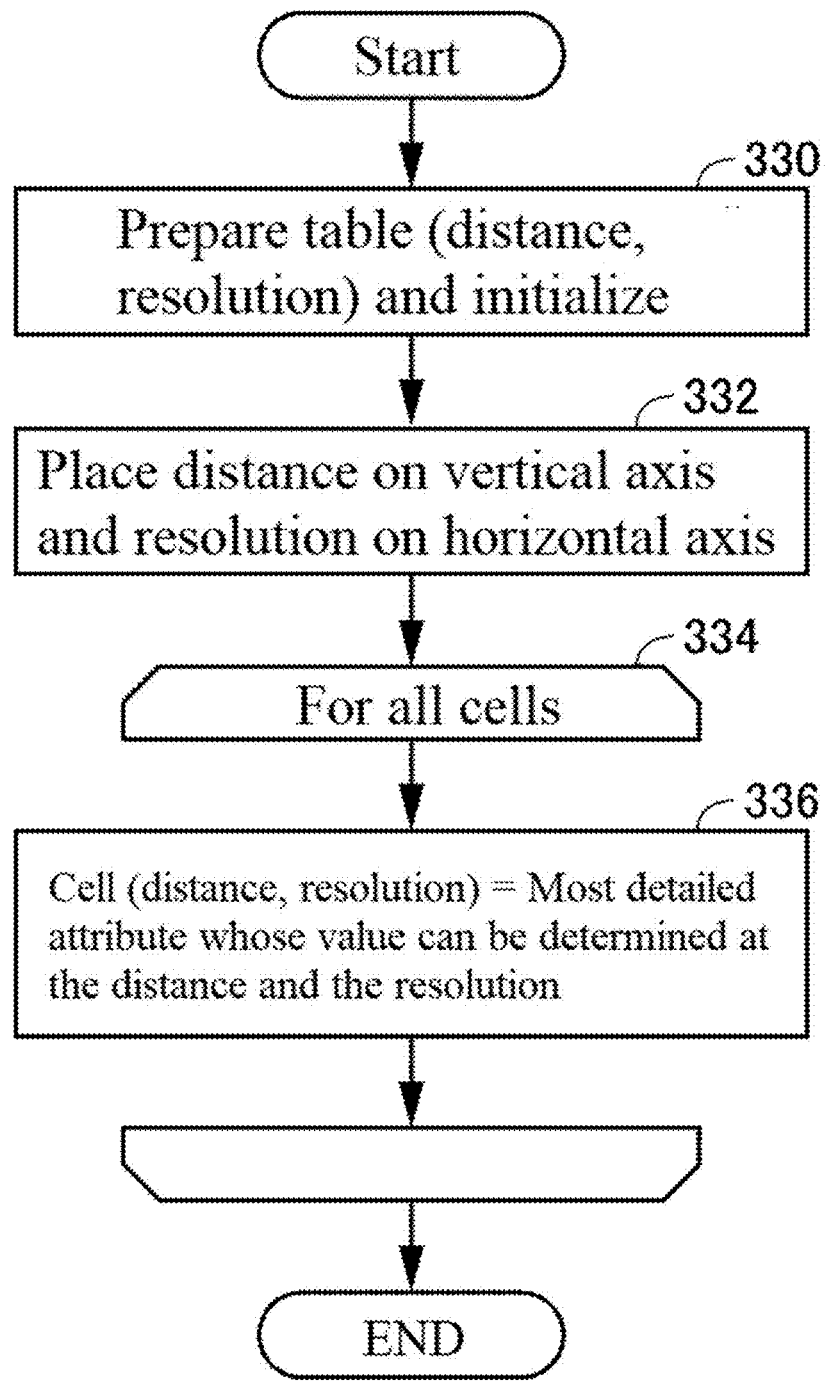
FIG. 12 is a flow chart a control structure of a program for generating a detection attribute output table.

FIG. 12 shows a control structure of a program in which in-vehicle device 210 of vehicle 62 generates detection attribute output table 160 based on resolution selection table 150. In this embodiment, detection attribute output table 160 is generated by vehicle 62. However, the disclosure is not limited to such embodiments. Edge server 60 may generate detection attribute output table 160 from resolution selection table 150 and transmit it to vehicle 62 together with resolution selection table 150.

Referring to FIG. 12, this program includes a step 330 in which in-vehicle device 210 prepares a storage area of detection attribute output table 160 and initializes the contents thereof, a step 332 in which in-vehicle device 210 places the distance on the vertical axis and the resolution on the horizontal axis of detection attribute output table 160, respectively, and a step 334 in which in-vehicle device 210 repeats a step 336 for all cells of detection attribute output table 160.

In step 336, the target cell to be processed in detection attribute output table 160 prepared by in-vehicle device 210 in a step 330 is determined to be the most detailed attribute whose value can be determined by the distance and the image of the resolution.

More specifically, in step 336, in-vehicle device 210 determines the value of the target cell corresponding to the distance on the vertical axis and the resolution on the horizontal axis as follows. That is, in-vehicle device 210 checks the value of the horizontal axis corresponding to the distance being processed in resolution selection table 150 in order from the left, and determines the most detailed attribute whose value can be determined at the target resolution. Then, in-vehicle device 210 sets a pre-assigned value indicating the type of the attribute as the value of the cell in detection attribute output table 160. For example, the simple attribute is assigned as a value of 0, the detailed attribute is assigned as a value of 1, the behavioral attribute is assigned as a value of 2, the body orientation is assigned as a value of 3, and the face orientation is assigned as a value of 4. Depending on the combination of the distance and the resolution corresponding to the cell, none of the attributes may be determined. In such a case, although not particularly limited, a value of "−1" is stored in the corresponding cell in this embodiment. In this embodiment, as the value of each cell in detection attribute output table 160, a numerical value indicating the most detailed attribute that can be determined for the combination of the distance and resolution of the cell is used. As a result, the following effects are obtained.

When a certain distance and a certain resolution are given, a numerical value (0, 1, 2, 3, or 4) indicating the most detailed attribute obtained by the combination is obtained from detection attribute output table 160. The degree of detail of the attribute increases as the value increases. Therefore, when this numerical value is obtained, an attribute corresponding to a numerical value smaller than this numerical value can obtained. Therefore, all determinable attributes can be known by storing only one value in each cell without listing and storing the determinable attributes for the combination of the distance and the resolution of the cell. As a result, the size of each cell can be minimized and the storage area can be saved.

<<Program of In-vehicle Device 210 of Vehicle 62>>

Figure 13:
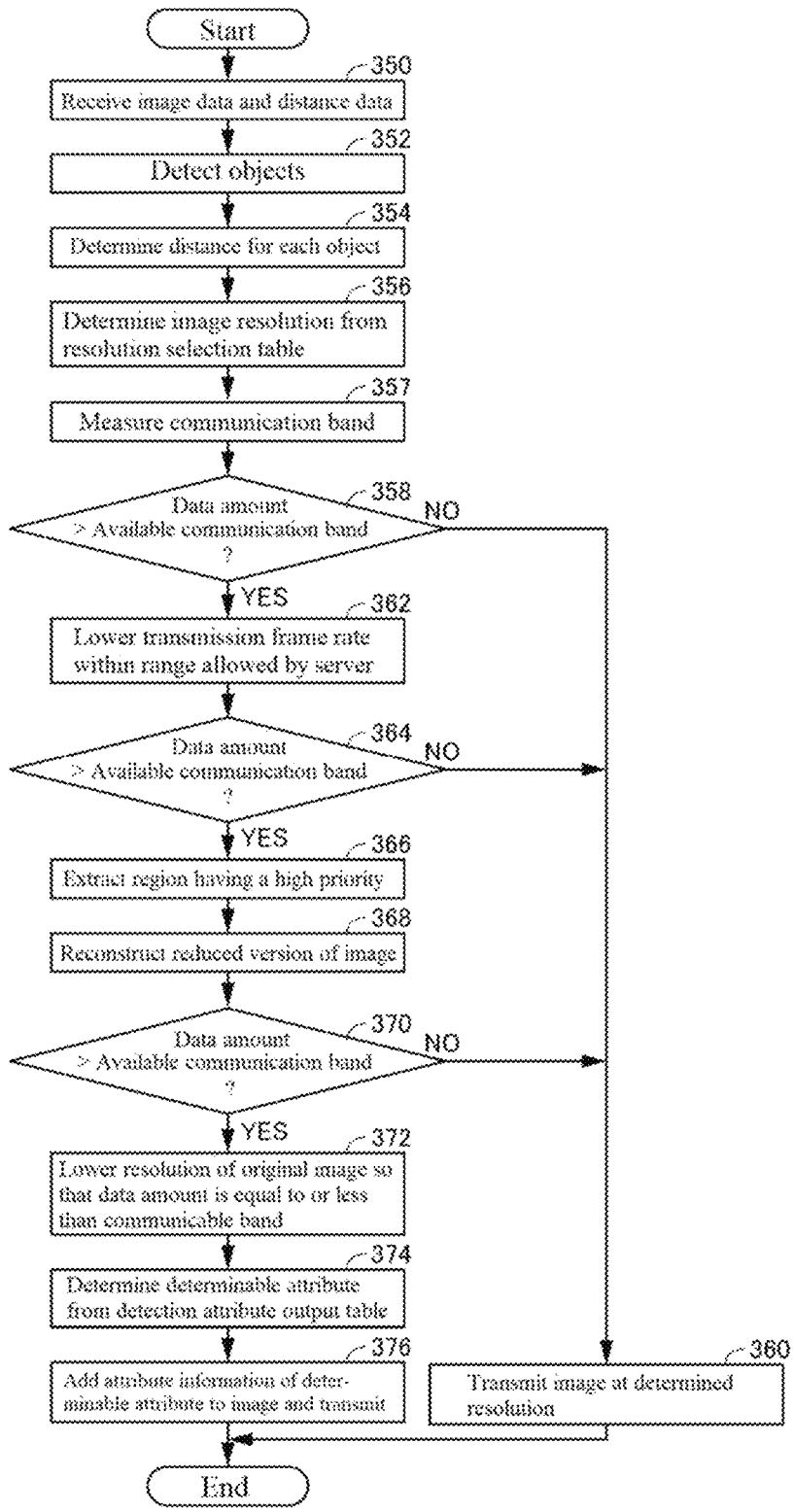
FIG. 13 is a flowchart showing a control structure of a program for realizing the function of the in-vehicle device.

FIG. 13 is a flowchart showing a control structure of a program for realizing the processing performed by vehicle 62 by in-vehicle device 210. This program is repeatedly executed at a predetermined cycle. The period is normally a predetermined first period, but can be changed to a second period longer than the first period by the program as described below. The first cycle is, for example, 100 milliseconds. The second period is, for example, 200 milliseconds. The second period can be selected from a plurality of patterns. Referring to FIG. 13, the program includes a step 350 for receiving image data and distance data from a camera, LiDAR, or millimeter wave radar, a step 352 for detecting objects in the image data, and a step 354 for determining the distance from camera 202 for each detected object.

The program further includes a step 356 of determining the image resolution using resolution selection table 150 based on the distance determined in step 354 and the target attribute received from edge server 60, a step 357 of measuring the currently available communication band, and a step 358 of branching the control flow according to whether or not the data amount of the image data according to the image resolution determined in step 356 is greater than the available communication band measured in step 357. The program further includes a step 360 of transmitting the image data of the resolution determined in step 356 to edge server 60 and terminating the processing when the determination in step 358 is negative, that is, when the data amount of the image data is less than or equal to the available communication band.

The program further includes a step 362 for reducing the transmission data amount when the determination in step 358 is positive, that is, when the image data amount exceeds the available communication band. In this embodiment, in step 362, the transmission frame rate is lowered within the range allowed by edge server 60. The program further includes a step 364 for branching the flow of control according to whether or not the transmission data amount when the image data is transmitted using the transmission frame rate determined in step 362 exceeds the available communication band. When the determination in step 364 is negative, that is, when the transmission data amount is less than or equal to the available communication band, the control proceeds to step 360. By lowering the transmission frame rate in step 362, the period of data transmission changes from the first period to a longer second period.

The program further includes a step 366 of extracting a region having a high priority in the image when the determination in step 364 is positive, and a step 368 of reconstructing a reduced version of the image by using the image extracted in step 366. The functions of step 366 and step 368 are also for reducing the transmission data amount.

This program further includes a step 370 for determining whether or not the transmission data amount obtained by the processing up to step 368 exceeds the available communication band, and branching the flow of control in accordance with the determination. When the determination in step 370 is negative, that is, when the transmission data amount is less than or equal to the available communication band, the control proceeds to step 360.

This program further includes a step 372 of lowering the resolution of the original image so that the data amount is less than or equal to the communicable band when the determination in step 370 is positive, and a step 374 of determining an attribute determinable from the image data by table lookup from detection attribute output table 160 based on the resolution determined in step 372 and the distance determined in step 354. The program further includes a step 376 in which the attribute determined in step 374 is added to the image of the resolution determined in step 372 as attribute information and transmitted to edge server 60, and the processing is terminated.

In this embodiment, when there is a plurality of objects detected in step 352, the resolution of the image is determined based on the attribute that requires the highest resolution among them. However, the present disclosure is not limited to such embodiments. For example, the processing from step 356 to step 376 may be executed for each object (excluding step 357). Alternatively, images with different resolutions may be generated for each region of the image of each object in the image, and the images may be collectively transmitted to edge server 60. The processing performed in step 366 and step 368 corresponds to such processing.

In the in the process of FIG. 13, the processes of steps 362, 366 and 368, and 372 and 374 are sequentially performed with the determination regarding the data amount interposed therebetween. However, the present disclosure is not limited to such embodiments. When the determination regarding the data amount is positive, step 376 may be executed after executing only step 362, only steps 366 and 368, or only steps 372 and 374. In addition, any combination thereof may be performed in any order with the determination regarding the data amount interposed therebetween. For example, when the determination in step 358 is positive, the processing from step 362 to step 370 is not performed, and the processing of step 372 and subsequent steps may be directly performed. Alternatively, an embodiment in which the order of the process of reducing the transmission frame rate as in step 362 and the process of reconstructing the image and reducing the data amount as in steps 366 and 368 is reversed is also possible.

<<Computer System>>

In the following description, CPU stands for Central Processing Unit, DVD stands for Digital Versatile Disc, GPU stands for Graphics Processing Unit, ROM stands for Read-Only Memory, RAM stands for Random Access Memory, GPS stands for Global Positioning System, and RF stands for Radio Frequency.

—Edge Server 60—

Figure 14:
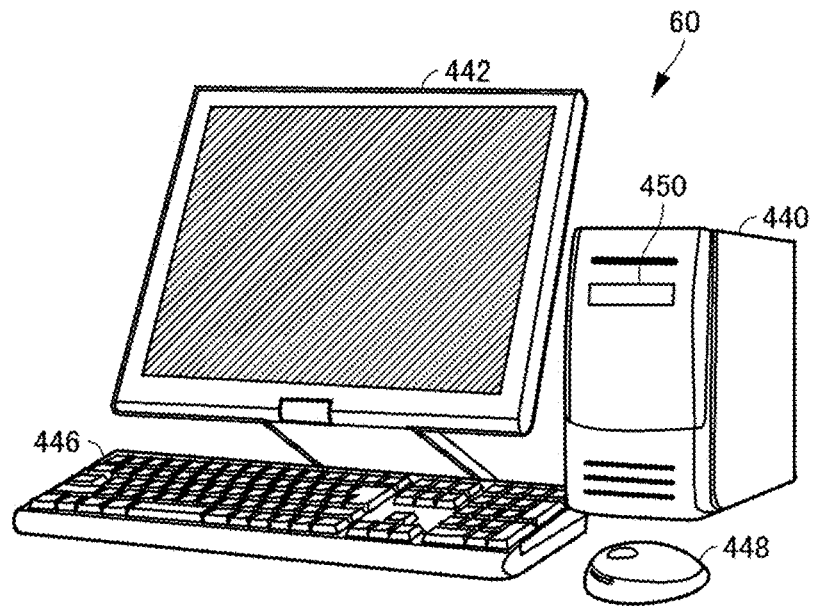
FIG. 14 is an external view of the edge server according to the first embodiment.
Figure 15:
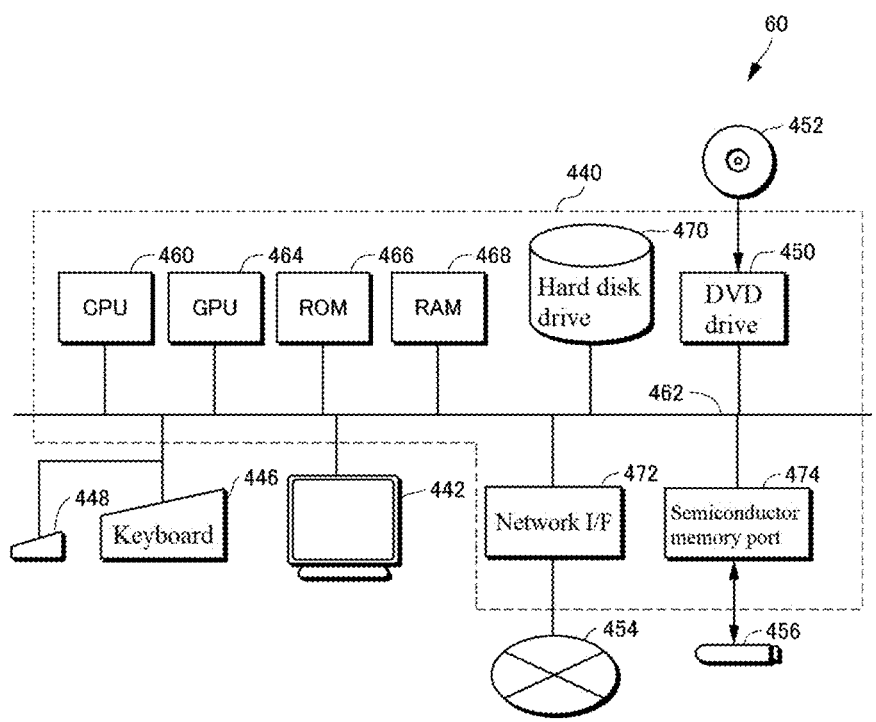
FIG. 15 is a hardware block diagram of the edge server shown in FIG. 14.

As shown in FIG. 14, edge server 60 includes a computer 440 having a DVD drive 450 capable of writing to and reading from a DVD 452 shown in FIG. 15, and a monitor 442, a keyboard 446 and a mouse 448 all connected to computer 440.

Referring to FIG. 15, computer 440 of edge server 60 includes a CPU 460 and a bus 462 connected to CPU 460 and serving as a communication path for data and commands between CPU 460 and other modules of computer 440.

Computer 440 further includes a GPU 464, a ROM 466, a RAM 468, a hard disk drive 470 which is a nonvolatile auxiliary storage device, the above-described DVD drive 450 to which DVD 452 can be attached, a network I/F 472 which provides a connection to network 454 for CPU 460, and a semiconductor memory port 474 which is connected to bus 462 and to which a semiconductor memory 456 can be attached and detached. All of them are connected to bus 462.

Figure 16:
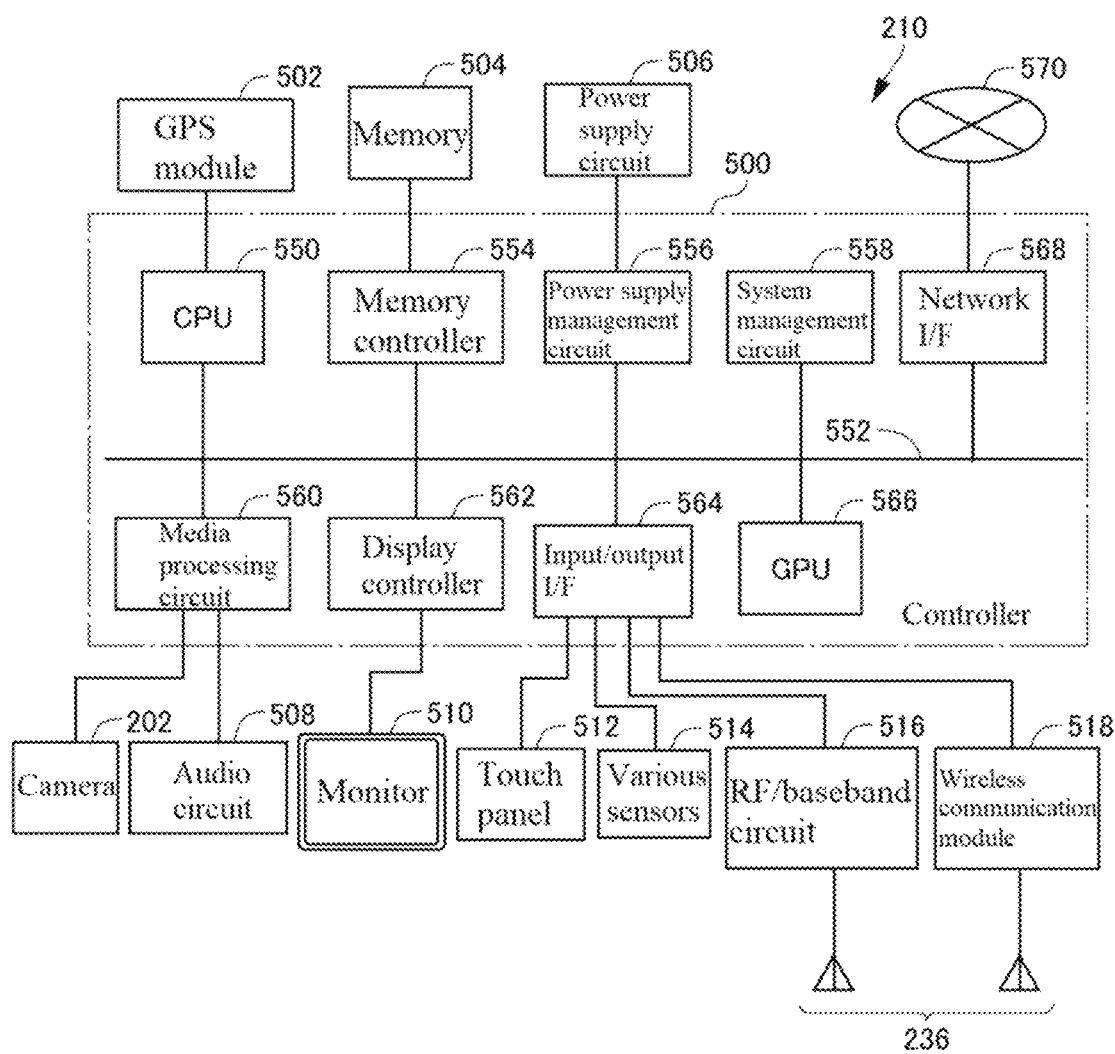
FIG. 16 is a hardware block diagram of an in-vehicle device according to the first embodiment.

Edge server 60 used in the above embodiment can be realized by the computer hardware shown in FIG. 14 and FIG. 15, its peripheral devices, and a program executed thereon. As shown in FIG. 16, in-vehicle device 210 used in the above embodiment can be realized by computer hardware, its peripheral devices and peripheral modules, and a program executed on the computer hardware.

A computer program for causing computer 440 to function as each functional unit such as edge server 60 according to each embodiment described above is stored and distributed in DVD 452 mounted on DVD drive 450 or semiconductor memory 456 mounted on semiconductor memory port 474, and is further transferred from these to hard disk drive 470. Alternatively, the program may be transmitted to computer 440 via network 454 and network I/F 472 and stored in hard disk drive 470. The program is loaded into RAM 468 at the time of execution. The program may be directly loaded into RAM 468 from network 454 or via network 454 and network I/F 472. ROM 466 stores a program for starting up computer 440. RAM 468 and hard disk drive 470 are used to store data such as sensor data, analysis results, and vehicle information. GPU 464 executes numerical calculations and the like in parallel and at high speed. It is used to analyze sensor data from a large number of sensors. Monitor 442, keyboard 446, and mouse 448 are used when an administrator of edge server 60 operates edge server 60.

The program includes an instruction sequence including a plurality of instructions for causing computer 440 to function as edge server 60 and each functional unit thereof according to each of the embodiments described above. Some of the basic functions required to cause computer 440 to perform this operation are provided by an operating system or a third party program running on computer 440 or various dynamically linkable programming toolkits or program libraries installed on computer 440. Therefore, the program itself does not necessarily include all the functions necessary to implement the system, apparatus, and method of this embodiment. The program may include, among the instructions, only instructions for implementing the functions of the system, apparatus or method described above by dynamically invoking an appropriate function or an appropriate program in a programming tool kit or program library at runtime in a controlled manner to achieve a desired result. Needless to say, all necessary functions may be provided only by the program.

—In-Vehicle Device 210—

Referring to FIG. 16, in-vehicle device 210 includes a controller 500, a GPS module 502 connected to controller 500, a memory 504 connected to controller 500, a power supply circuit 506 for controller 500, and an audio circuit 508 and camera 202 connected to controller 500.

In-vehicle device 210 further includes a monitor 510 including a liquid crystal display (LCD), a touch panel 512, various sensors 514 including an accelerometer, a tilt sensor, a temperature sensor, a moisture sensor, a pressure sensor, an illuminance sensor, and the like, a RF/baseband circuit 516 for providing a wireless communication function using a portable telephone line such as a 5G, and a wireless communication module 518 for providing a wireless communication function such as Wi-Fi communication. All of them are connected to controller 500.

Controller 500 is substantially a computer and includes a CPU 550 and a bus 552 serving as a transmission path of data and commands between CPU 550 and each unit in controller 500. Controller 500 further includes a memory controller 554 which is connected to bus 552 and controls memory 504 in accordance with a command from CPU 550 to write and read data, a power supply management circuit 556 which manages power supply circuit 506 in accordance with control by CPU 550, and a system management circuit 558 which manages, for example, operation timing of each unit in a controller 500.

Controller 500 further includes a media processing circuit 560 connected to bus 552 to interface with audio circuit 508 and camera 202, a display controller 562 for controlling monitor 510 according to commands and parameters transmitted from CPU 550 via bus 552, and an input/output I/F 564 connected to external modules such as touch panel 512, various sensors 514 and RF/baseband circuit 516 and bus 552 to interface between CPU 550 and memory 504 and the external modules. Controller 500 further includes a GPU 566 that is connected to bus 552 and executes processing of performing graphic processing, parallel calculation, and the like delegated from CPU 550 and returning a result to CPU 550 via bus 552, and a network I/F 568 for connecting controller 500 to an in-vehicle network 570 or the like. RF/baseband circuit 516 and wireless communication module 518 of FIG. 16 constitute wireless communication device 236 shown in FIG. 10.

Similarly to edge server 60, a computer program for causing controller 500 shown in FIG. 16 to function as each functional unit of in-vehicle device 210 according to each embodiment described above is transmitted from an external network to controller 500 via wireless communication by RF/baseband circuit 516 or wireless communication module 518 in this embodiment, and stored in memory 504 via memory controller 554. If in-vehicle device 210 has a memory card processing module, the program can be transferred from the memory card to memory 504. The program stored in memory 504 is read, interpreted, and executed by CPU 550 at the time of execution. The execution result is transferred to an address determined by the program. The data is stored in a memory designated by the address or transferred to a predetermined module for processing. The program may be executed directly from a memory card or the like.

The program includes an instruction sequence including a plurality of instructions for causing controller 500 to function as in-vehicle device 210 according to each of the embodiments and each functional unit thereof. Some of the basic functionality required to cause controller 500 to perform this operation is provided by an operating system or third party program running on controller 500 or various dynamically linkable programming toolkits or program libraries installed in controller 500. Therefore, the program itself does not necessarily include all the functions necessary to implement the system, apparatus, and method of this embodiment. The program may include, among the instructions, only instructions for implementing the functions of the above-described system, apparatus, or method by dynamically invoking an appropriate function or an appropriate program in a programming tool kit or program library at runtime in a controlled manner to achieve a desired result. Needless to say, all necessary functions may be provided only by a program.

The operation of computer 440 shown in FIG. 15 and controller 500 shown in FIG. 16 and their peripherals is well known or not particularly relevant to this disclosure. Therefore, their detailed construction and their operation will not be further described in this specification.

<Operation>

The above-described edge server 60 and vehicle 62 operate as follows. The following description of the operation is divided into three cases: (A) initial processing; (B) a case where an image with a resolution sufficient to determine the attribute designated by edge server 60 is obtained; and (C) a case where an image with a resolution sufficient to determine the attribute designated by edge server 60 is not obtained.

<<Initial Processing>>

—Processing of Edge Server 60—

Referring to FIG. 8, resolution selection table creation unit 184 creates resolution selection table 150 based on the analysis capability of driving assistance analysis unit 182 and the content of the analysis process. Resolution selection table 150 is stored in resolution selection table storage unit 186. This processing is performed, for example, when driving assistance analysis unit 182 is installed in edge server 60 for the first time, when a new function is added to driving assistance analysis unit 182, or when any of the functions of driving assistance analysis unit 182 is enhanced. For example, when driving assistance analysis unit 182 uses an existing analysis engine, it is also conceivable that a provider of the analysis engine simultaneously provides resolution selection table 150 to the user. Note that this disclosure relates to resolution of the image, and the content of resolution selection table 150 varies depending on whether or not driving assistance analysis unit 182 has a capability of performing super-resolution processing, for example.

It is assumed that vehicle 62 newly enters the coverage area of edge server 60. Vehicle 62 detects that communication with different edge server 60 than before has become possible, and transmits its own vehicle information to edge server 60. Edge server 60 stores this vehicle information in vehicle management unit 188 of FIG. 8. In response to vehicle management unit 188 storing the new vehicle information, resolution selection table transmission unit 190 reads resolution selection table 150 from resolution selection table storage unit 186. Resolution selection table transmission unit 190 transmits resolution selection table 150 to vehicle 62 through communication device 180 together with an attribute (target attribute) required for processing of driving assistance performed by driving assistance analysis unit 182.

—Processing of Vehicle 62—

Referring to FIG. 10, table/target attribute reception unit 254 receives resolution selection table 150 and the target attribute from edge server 60 via wireless communication device 236. Table/target attribute reception unit 254 stores resolution selection table 150 in resolution selection table storage unit 256, and the target attribute in target attribute storage unit 266. In response to resolution selection table 150 being stored in resolution selection table storage unit 256, detection attribute output table generation unit 258 generates detection attribute output table 160. Generated detection attribute output table 160 is stored in detection attribute output table storage unit 260. This completes the preparation for image transmission from vehicle 62 to edge server 60.

(A) when an Image with a Sufficient Resolution is Obtained

—Vehicle 62—

Each of millimeter wave radar 200, camera 202, and LiDAR 204 periodically outputs sensor data regarding the surrounding environment and gives the sensor data to I/F unit 230. I/F unit 230 gives the image data to image acquisition unit 232 and gives the other distance measurement data to object/distance detection unit 250. The image output by camera 202 is image data of the maximum resolution in the performance.

Millimeter wave radar 200 outputs information such as a distance to a detected object and a relative speed with respect to the camera. On the other hand, LiDAR 204 outputs a set (point cloud) of three dimensional positions of points of the laser beam reflected back from the object. Millimeter wave radar 200 and LiDAR 204 function as a ranging sensor that measures a distance from the vehicle to the object.

Object/distance detection unit 250 receives the outputs of millimeter wave radar 200 and LiDAR 204 together with the image data received by image acquisition unit 232 (step 350 in FIG. 13), and integrates and analyzes them. As a result, object/distance detection unit 250 detects the object in the image (step 352) and calculates the distance from the camera to the object (step 354). In the following description, a case where one object is detected will be described in order to simplify the description. However, in a case where a plurality of objects is detected, the following processing may be executed on the basis of the object requiring the largest resolution among the objects. The object at a maximum distance from the camera can also be used as a reference. Alternatively, the object at the maximum distance from the camera within a distance range designated from edge server 60 may be used as a reference. Distant objects have no or less urgency with respect to handling of driving assistance. This is because, in many cases, there is no problem if the attribute of the distant object can be determined at the time of the next image capturing.

Resolution decision unit 252 refers to resolution selection table 150 stored in resolution selection table storage unit 256 using the distance between the object detected by object/distance detection unit 250 and camera 202 and the target attribute stored in target attribute storage unit 266, and decides the resolution of the image data (step 356 in FIG. 13). Transmission data generation unit 264 calculates a data amount after the image acquired by image acquisition unit 232 is converted into the determined resolution. Transmission data generation unit 264 further determines whether or not the data amount of the image data is larger than the available communication band in view of the size of the communication band measured by communication state determination unit 262 in step 357 of FIG. 13 (step 358). Here, it is assumed that this determination is negative. Since there is no problem even if the image data of the determined resolution is transmitted, transmission data generation unit 264 of FIG. 10 converts the image into the determined resolution, and transmits it to edge server 60 via wireless communication device 236 (step 360 of FIG. 13).

—Edge Server 60—

Referring to FIG. 8, communication device 180 receives the image data and provides it to driving assistance analysis unit 182. This image data has a resolution sufficient for driving assistance analysis unit 182 to determine the expected attribute. Accordingly, driving assistance analysis unit 182 analyzes the image data and performs driving assistance processing. The result of the analysis process is stored in vehicle management unit 188 and is transmitted to each vehicle in the coverage area of edge server 60.

(B) A Case where an Image with a Sufficient Resolution is not Obtained or a Case where a Transmission Data Amount Exceeds a Communication Band The processing from step 350 to step 357 in FIG. 13 is the same as that when an image of sufficient resolution is obtained. However, if an image with sufficient resolution is not obtained or if the transmission data amount exceeds the communication band, the determination in step 358 is positive. That is, the data amount of the image data exceeds the communication band. Therefore, in step 362, vehicle 62 calculates the transmission data amount when the transmission frame rate is lowered within the allowable range of the server. The resolution of the image is maintained at the value determined in step 356.

Thereafter, the processing branches at step 364 and step 370. These will be described below in order.

(B1) when Transmission Data Amount≤Available Communication Band

In this case, the determination in step 364 is negative. In step 360, vehicle 62 converts the image data into this resolution and transmits the image data to edge server 60.

The processing performed by edge server 60 that has received the image data is the same as the processing performed in "(A) when an image with a sufficient resolution is obtained".

(B2) when Transmission Data Amount>Available Communication Band

In this case, the determination in step 364 is positive. At this time, a region having a high transmission priority is extracted from the image (step 366 in FIG. 13). The transmission priority is information shared by edge server 60 and vehicle 62 in advance as a priority when transmitting the detected object. Examples of the object having a low transmission priority include an object other than a dynamic object, an object whose reflection area is less than or equal to a threshold value and whose attribute is obviously difficult to determine, and an object existing at a position farther than a distance designated by edge server 60. The region having a high transmission priority refers to a region that includes at least the detected object and is smaller than the original image.

In step 368, a reduced version of the image is reconstructed using the image of the extracted region (step 368). When there is a plurality of objects, a plurality of regions including them is arranged at their positions on the screen. Here, the resolution of each of the extracted regions is the resolution determined in step 356. In areas other than these areas, for example, blank images are arranged. The blank image is efficiently compressed at the time of transmission. Therefore, by arranging the images in this way, the reduced version of the image with a small transmission data amount can be reconstructed. In a region other than the region of the object, instead of a blank image, the image with a particularly reduced resolution may be arranged, or the image in which a specific pattern is recorded and whose transmission data amount is small may be arranged.

In step 370, it is determined whether or not the data amount of the reconstructed image is less than or equal to the available communication band.

(B2-1) when Data Amount≤Available Communication Band

In this case, the determination in step 370 is negative. As a result, vehicle 62 transmits the image data reconstructed as described above to edge server 60 in step 360. The processing performed by edge server 60 is similar to the processing performed in "(A) when an image with a sufficient resolution is obtained".

(B2-2) when Data Amount≥Available Communication Band

In this case, the determination in step 370 is positive. That is, it is determined in step 370 that the data amount is still larger than the communication band. This is the case, for example, when many objects having a high transmission priority are included in the image in the wide range. Vehicle 62 further performs the following processing.

That is, vehicle 62 lowers the resolution of the original image so as to be less than or equal to the data amount transmittable using the available communication band, regardless of the value of the resolution determined in step 356. When the resolution is lowered in this way, the resolution cannot be used for edge server 60 to determine the target attribute, but there is a possibility that another attribute can be determined using the image. However, edge server 60 cannot determine which attribute can be determined and which attribute cannot be determined unless edge server 60 actually performs processing for determining the attribute of the object from the image.

Therefore, in this embodiment, vehicle 62 adds information about what attribute can be determined using the image whose resolution is lower than the required level to the image. Specifically, vehicle 62 refers to detection attribute output table 160 stored in detection attribute output table storage unit 260 shown in FIG. 10 on the basis of the distance to the object in step 374 and the resolution determined in step 372, and determines up to which attribute can be determined (step 374). By referring to detection attribute output table 160, a value indicating the most detailed attribute type determinable from the image data obtained in step 372 is determined.

Vehicle 62 adds attribute information indicating the type of attribute determined in step 374 to the image data converted into low-resolution image data in step 372. Vehicle 62 transmits the image data to which the attribute information is added to edge server 60 and terminates the processing.

Upon receiving this data, edge server 60 detects that attribute information is added to the received image. In this case, edge server 60 determines the attribute designated by the attribute information and the determinable attribute from the received image, and uses the determined attribute for the processing for driving assistance.

Advantageous Effects of First Embodiment

As described above, according to this embodiment, edge server 60 transmits the desired attribute (target attribute) and resolution selection table 150 to vehicle 62. Vehicle 62 converts the image so as to have the lowest resolution in a range in which edge server 60 can determine the target attribute, and transmits the converted image to edge server 60. Vehicle 62 does not need to transmit the image to edge server 60 using a resolution higher than necessary. As a result, it is possible to reduce the transmission data amount required for the processing of the driving assistance by edge server 60 without deteriorating the quality of the processing. When the image data is larger than the available communication band, vehicle 62 reduces the transmission frame rate when transmitting the image. In this case, the resolution of the image data received by edge server 60 is the desired resolution. Thus, the influence on the processing of the driving assistance is minimized.

When the image data cannot be transmitted to edge server 60 even if the transmission frame rate is reduced, vehicle 62 reconstructs the image so that the transmission data amount is further reduced and transmits the reconstructed image to edge server 60. If the transmission data amount is still larger than the available communication band, vehicle 62 lowers the resolution of the original image to such an extent that the image can be transmitted using the communication band and transmits the image to edge server 60. At this time, vehicle 62 adds, to the image data, attribute information indicating the type of attribute that can be determined using the image of the resolution. When edge server 60 receives this image data, edge server 60 checks the attribute information added to the image data to know an attribute that can be determined from the image data, and can immediately execute processing therefor. As compared with the case where attribute information is not added, it is possible to prevent edge server 60 from unnecessarily performing processing for extracting an attribute that cannot be determined from the image.

As a result, vehicle 62 can transmit the information necessary for driving assistance to edge server 60 while effectively using the communication band.

Second Embodiment

<Configuration>

In the first embodiment, resolution selection table 150 is created by edge server 60 and transmitted to vehicle 62. Vehicle 62 creates detection attribute output table 160 and adds attribute information obtained from detection attribute output table 160 to the image data when the resolution of the transmission image is low. However, the present disclosure is not limited to such embodiments. For example, detection attribute output table 160 may be a database (DB) instead of a so-called table format. When the DB is used, vehicle 62 can obtain necessary attribute information by using the function of the DB without creating detection attribute output table 160. This second embodiment is such an embodiment.

Figure 17:
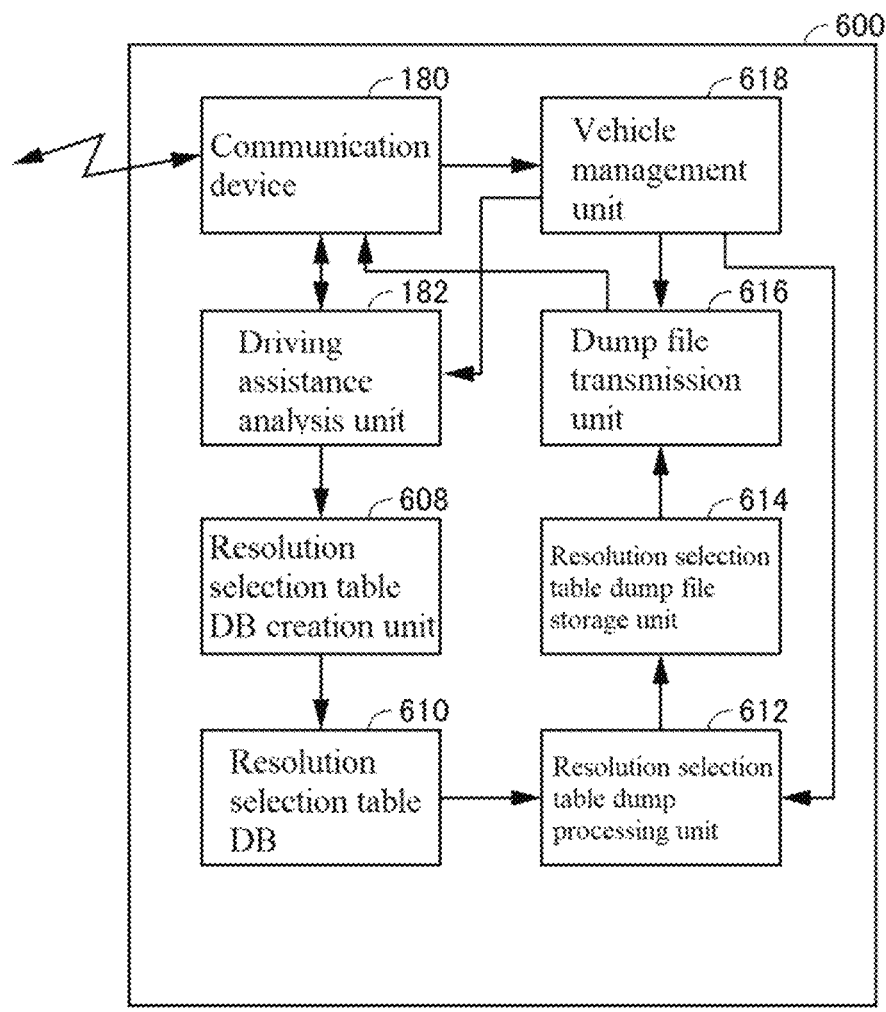
FIG. 17 is a functional block diagram of an edge server in accordance with a second embodiment.
Figure 18:
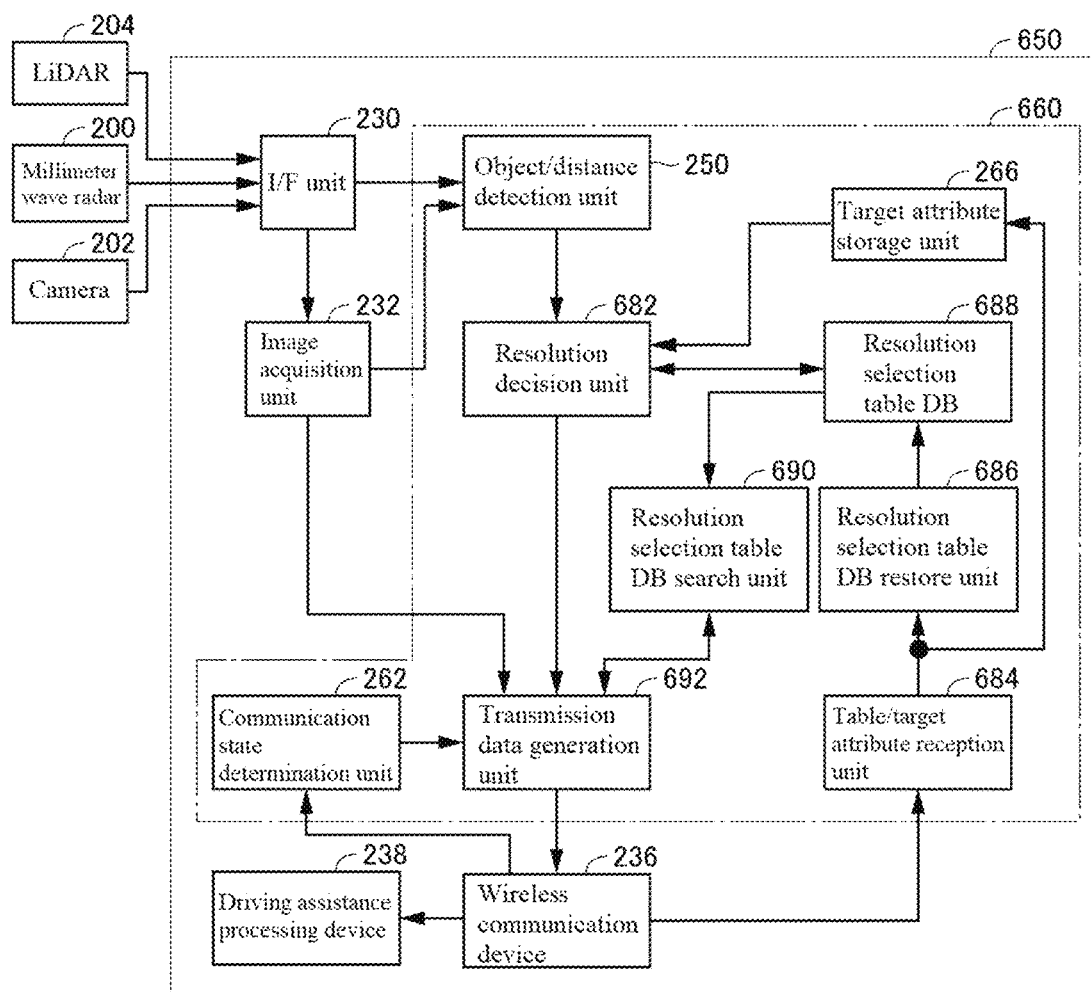
FIG. 18 is a functional block diagram of an in-vehicle device according to the second embodiment.

The overall configuration is similar to that of FIG. 1. Here, an edge server 600 shown in FIG. 17 is used instead of edge server 60 shown in FIG. 8. Similarly, an in-vehicle device 650 shown in FIG. 18 is used instead of in-vehicle device 210 shown in FIG. 10. These hardware configurations are the same as those in the first embodiment. Hereinafter, a functional configuration thereof will be described.

<<Edge Server 600>>

Referring to FIG. 17, edge server 600 includes communication device 180 and driving assistance analysis unit 182 which are the same as those shown in FIG. 8, and a vehicle management unit 618 for storing and managing vehicle information including a vehicle type, a position, a moving speed, an arrangement state of a sensor, and the like of each vehicle received by communication device 180 from the vehicle or the like. Edge server 600 further includes a resolution selection table DB creation unit 608 for extracting the same information as the information for creating resolution selection table 150 from the configuration of driving assistance analysis unit 182 and registering the extracted information in the DB, and a resolution selection table DB 610 for storing the same information as resolution selection table 150 and providing a search function using various search methods.

Resolution selection table DB 610 is a so-called relational DB and includes a resolution selection table in the sense of a DB.

The record format of this resolution selection table is, for example, <record identifier, distance lower limit, distance upper limit, attribute identifier, and resolution>. The record identifier is a unique identifier for identifying each record, and is always used in a record of a normal DB. The distance lower limit and the distance upper limit indicate a distance range to which the record can be applied. The attribute identifier is an identifier for identifying an attribute serving as a determination target. As in the first embodiment, the attributes include simple attribute, detailed attribute, behavioral attribute, body orientation, and face orientation. The attribute identifier is used to distinguish these attributes, and a unique value is assigned to each attribute. Similar to the first embodiment, the resolution includes HD, FHD, QHD, and 4K.

For example, if the distance from the image to the detected object is the 30 m and the target attribute is the body orientation, the following query is given to the DB.

"SELECT DISTINCT resolution FROM resolution selection table WHERE lower distance limit<30 m AND upper distance limit>=30 m AND attribute identifier=(identifier of) body orientation"

Referring to FIG. 6, this query results in a list of resolutions {FHD, HD} that satisfy this condition. In order to reduce the transmission data capacity, the smallest resolution can be selected from this list.

Edge server 600 further includes a resolution selection table dump processing unit 612 for outputting the dump file from the resolution selection table of resolution selection table DB 610 in response to vehicle management unit 618 receiving the vehicle information from the new vehicle, a resolution selection table dump file storage unit 614 for storing the dump file obtained by resolution selection table dump processing unit 612, and a dump file transmission unit 616 for transmitting the dump file stored in resolution selection table dump file storage unit 614 to the vehicle corresponding to the vehicle information newly received by vehicle management unit 618 through communication device 180.

<<In-Vehicle Device 650>>

Referring to FIG. 18, compared with in-vehicle device 210 shown in FIG. 10, in-vehicle device 650 according to the second embodiment includes the image data transmission unit 660 instead of image data transmission unit 234 of FIG. 10. Image data transmission unit 660 does not use resolution selection table 150 and detection attribute output table 160 as shown in FIG. 10, but uses a resolution selection table DB.

Like image data transmission unit 234 of FIG. 10, image data transmission unit 660 includes object/distance detection unit 250, communication state determination unit 262, and target attribute storage unit 266.

Image data transmission unit 660 further includes a table/target attribute reception unit 684 for receiving a dump file of resolution selection table 150 and a target attribute indicating an attribute to be determined by the vehicle from edge server 600 through wireless communication device 236 when the vehicle initially communicates with edge server 600, a resolution selection table DB 688, and a resolution selection table DB restore unit 686 for restoring resolution selection table DB 688 using the dump file received by table/target attribute reception unit 684.

Image data transmission unit 660 further includes a resolution decision unit 682 that determines a list of resolutions of the image to be transmitted to edge server 600 based on the distances detected for each object in the image by object/distance detection unit 250 and the target attributes stored in target attribute storage unit 266. Specifically, resolution decision unit 682 acquires a list of resolutions by issuing a query to resolution selection table DB 688. Image data transmission unit 660 further includes a transmission data generation unit 692 for generating the image for transmission obtained by changing the resolution of the image acquired by image acquisition unit 232 based on the resolution determined by resolution decision unit 682 and the communication state determined by communication state determination unit 262 and transmitting the image for transmission to vehicle 62 via wireless communication device 236.

Image data transmission unit 660 further includes a resolution selection table DB search unit 690 for providing transmission data generation unit 692 with a list of attributes that can be determined using the image of the resolution when transmission data generation unit 692 generates the image for transmission and the resolution at which the target attribute can be determined is not obtained and the resolution of the image is determined to be lower. Specifically, resolution selection table DB search unit 690 searches resolution selection table DB 688 for a list of attributes that can be determined at a given resolution.

The configuration (record configuration) of resolution selection table DB 688 is as described for resolution selection table DB 610 in FIG. 17. As described above, an example of a query issued by resolution decision unit 682 when deciding the resolution of the image is as follows.

"SELECT DISTINCT resolution FROM resolution selection table WHERE lower distance limit<30 m AND upper distance limit>=30 m AND attribute identifier=(identifier of) body orientation"

By this query, it is possible to obtain a list {FHD, HD} of the resolutions of images from which the target attribute can be determined when the distance is 30 m.

On the other hand, a query issued by resolution selection table DB search unit 690 is as follows.

"SELECT attribute identifier FROM resolution selection table WHERE distance lower limit<30 m AND distance upper limit>=30 m AND resolution=resolution determined by transmission data generation unit 692"

When resolution selection table DB search unit 690 issues this query to resolution selection table DB 688, a list of attributes that can be determined from the image of the object present at the specified distance (for example, 30 m) and having the resolution determined by transmission data generation unit 692 is obtained from resolution selection table DB 688. In the above query, attribute {3 (body orientation)} is obtained which satisfies the conditions that the distance to the object is 30 m and the resolution determined by transmission data generation unit 692 is less than or equal to FHD. Therefore, it can be seen that edge server 600 uses this image to determine the body orientation and simple attribute, detailed attribute and behavioral attribute that is coarser (less detailed) than the body orientation (see FIG. 7). Therefore, the vehicle may transmit a list of these attributes or an attribute name indicating the most detailed attribute to edge server 600 as attribute information.

<Operation>

Edge server 600 and in-vehicle device 650 according to the second embodiment operate as follows.

Referring to FIG. 17, resolution selection table DB creation unit 608 registers each record in the resolution selection table of resolution selection table DB 610 based on the function of driving assistance analysis unit 182. Resolution selection table DB creation unit 608 creates or updates resolution selection table DB 610 when driving assistance analysis unit 182 is activated for the first time, when a new function is added to driving assistance analysis unit 182, and when some modification is made to the function of driving assistance analysis unit 182.

Figure 19:
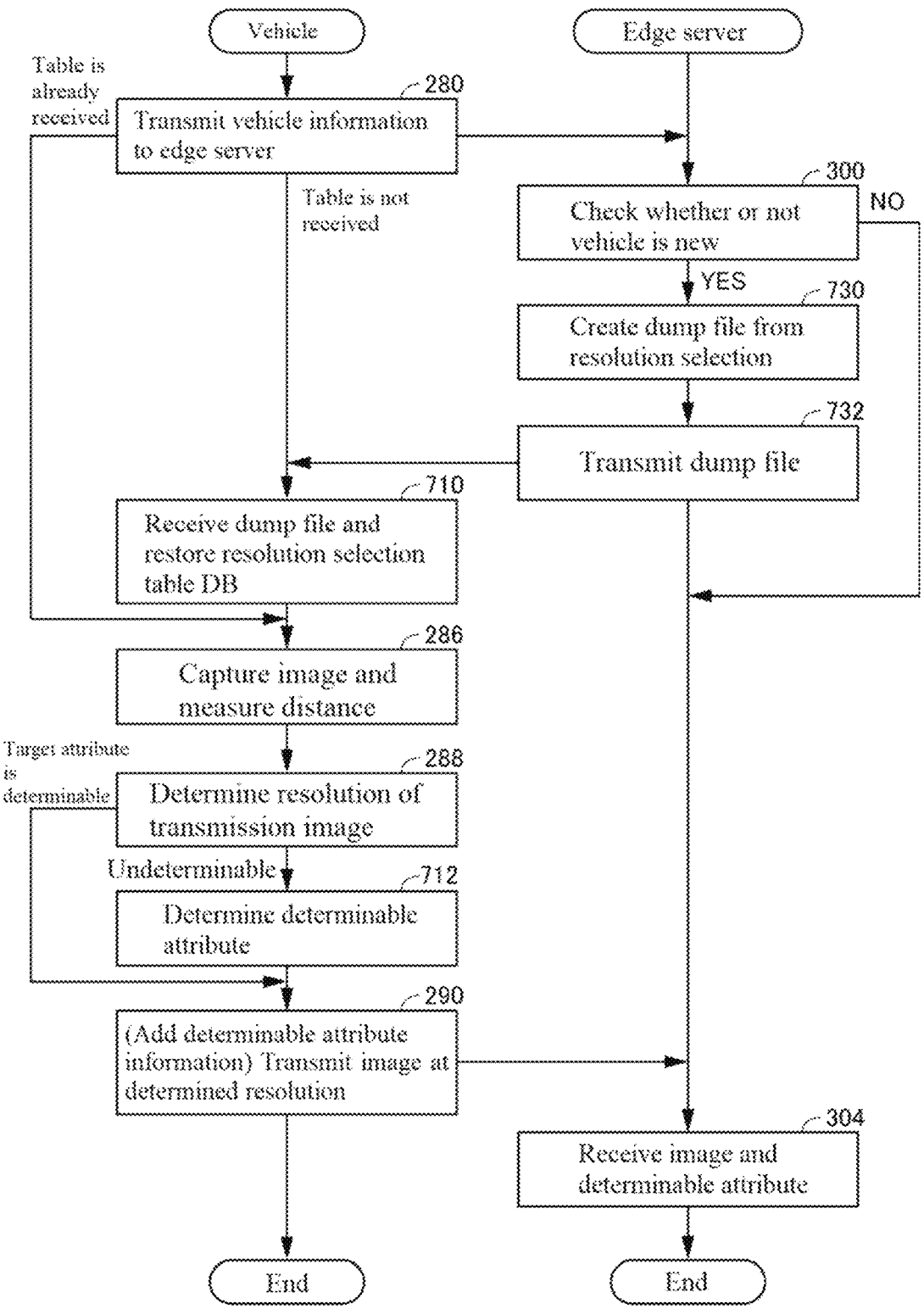
FIG. 19 is a sequence diagram of communication between an edge server and an in-vehicle device according to the second embodiment.

When in-vehicle device 650 enters the coverage area of edge server 600, referring to FIG. 19, in-vehicle device 650 transmits its own vehicle information to edge server 600 (step 280). In response to the reception of the vehicle information, edge server 600 checks whether or not the vehicle information is already registered in vehicle management unit 618 (step 300). When the vehicle is already registered in vehicle management unit 618, edge server 600 waits until the image is received from the vehicle (path from step 300 to step 304 in FIG. 19).

When the vehicle is not registered in vehicle management unit 618 yet, referring to FIG. 17, resolution selection table dump processing unit 612 of edge server 600 creates a dump file of resolution selection table DB 610 and stores it in resolution selection table dump file storage unit 614 (a step 730 of FIG. 19). In response to the dump file being stored in resolution selection table dump file storage unit 614, dump file transmission unit 616 transmits the dump file to in-vehicle device 650 through communication device 180 of edge server 600 together with an attribute (target attribute) that is the determination target of edge server 600 (a step 732).

Table/target attribute reception unit 684 of in-vehicle device 650 shown in FIG. 18 receives the dump file and the target attribute in a step 710 of FIG. 19, outputs the dump file to target attribute storage unit 266, and stores the target attribute in target attribute storage unit 266. Resolution selection table DB restore unit 686 restores resolution selection table DB 688 from this dump file. As a result, resolution selection table DB 688 can respond to the query from resolution decision unit 682 and the query from resolution selection table DB search unit 690. When the dump file of the resolution selection table has already been received, in-vehicle device 650 does not perform the processing of step 710 but performs the processing of step 286.

In step 286, the image is captured using camera 202 and the distance of each object in the image from camera 202 is measured. This processing is performed by object/distance detection unit 250 of FIG. 18. In subsequent a step 711, the query described above is issued to resolution selection table DB 688 based on the distance measured in step 286 and the target attribute stored in target attribute storage unit 266, thereby obtaining a list of corresponding resolutions. Resolution decision unit 682 decides the lowest resolution in the list of resolutions as the resolution of the transmission image.

In steps 358, 364, and 370 of FIG. 13, a determination is made as to whether transmission of the image at this resolution is possible, and if so, in-vehicle device 650 converts the image to that resolution and transmits it to edge server 600 (step 290). This corresponds to a case where the determination is negative in any of steps 358, 364, and 370 of FIG. 13.

If it is not possible to transmit the image of the resolution (if the determinations in steps 358, 364, and 370 in FIG. 13 are all positive), in-vehicle device 650 converts the image into the resolution of the data amount transmittable to edge server 600 on the basis of the available communication band in a step 712. In addition, in-vehicle device 650 determines a determinable attribute based on the image of the resolution after the conversion. Specifically, in-vehicle device 650 issues a query to resolution selection table DB 688 (FIG. 18) using the distance and the resolution as keys to search for an attribute determinable from the image of the resolution at the distance. In-vehicle device 650 determines an attribute obtained as a result of the query as attribute information to be transmitted to edge server 600.

Thereafter, in step 290, in-vehicle device 650 attaches attribute information indicating the most detailed attribute that can be determined by the image data to the image data after resolution conversion if necessary, and transmits the image data to edge server 600.

Edge server 600 receives this image in step 304. The subsequent operation of edge server 600 is the same as that of the first embodiment.

Advantageous Effects of Second Embodiment

As described above, according to this embodiment, the functions of both resolution selection table 150 and detection attribute output table 160 can be realized by using the DB even if detection attribute output table 160 is not created. Since it is not necessary to generate detection attribute output table 160, the configuration of in-vehicle device 650 can be further simplified.

<Modification>

In the first embodiment, resolution selection table 150 is transmitted from edge server 60 to vehicle 62, and vehicle 62 generates detection attribute output table 160. However, the present disclosure is not limited to such embodiments. For example, both resolution selection table 150 and detection attribute output table 160 may be created by edge server and transmitted to vehicle 62.

In the first embodiment and the second embodiment, when only the image with such a resolution that the target attribute cannot be determined can be transmitted, the in-vehicle device further lowers the resolution of the image and transmits information on an attribute that can be determined using the image with the lowered resolution to edge servers 60 and 600. However, the present disclosure is not limited to such embodiments. For example, in such a case, information indicating that the image with a sufficient resolution cannot be transmitted may be transmitted to edge server 60 or 600. In this case, it is not necessary to use detection attribute output table 160 or resolution selection table DB 688, and the configuration of the in-vehicle device can be further simplified.

When there are a plurality of vehicles capable of transmitting the image to edge servers 60 and 600, the following processing sequence may be employed. That is, each vehicle transmits, to edge server 60, 600, or the like, information on an attribute that can be determined even in the resolution of the image transmitted by itself. Based on this information, edge server 60, 600 or the like selects a vehicle to which the image is actually transmitted. Edge server 60, 600 or the like instructs the selected vehicle to transmit the image. The vehicle that has received the instruction transmits the image of the resolution used when determining the determinable attribute to edge server 60, 600, or the like. By using such a processing sequence, the image having a resolution with which edge server 60, 600, or the like can determine the target attribute can be acquired. Since only the selected vehicle needs to transmit the image, the transmission data amount can be reduced without degrading the processing quality of the driving assistance in edge server 60, 600, or the like.

Further, in the first embodiment and the second embodiment, the resolution is represented by a symbol such as "HD". This is because it is a typical resolution handled in current image processing. However, the present disclosure is not limited to such embodiments. For example, the resolution may be directly specified using a numerical value (vertical resolution x longitudinal resolution). Alternatively, each of the vertical and horizontal directions of the resolution may be defined by a continuous function of the distance and the target attribute. In this case, the vertical and horizontal ratios may be made equal to the ratio of HD or may be made equal to another value.

In the above-described embodiment, the distance between the vehicle (camera) and the target object is measured or calculated using a ranging sensor such as LiDAR. However, the present disclosure is not limited to such embodiments. For example, the distance to the target may be calculated using a stereo camera, or the distance to the target may be calculated using image processing on a plurality of images of a monocular camera.

Furthermore, in the above-described embodiment, when attribute information is attached to the image, edge server 60 and edge server 600 determine an attribute specified by the attribute information from the image. However, the present disclosure is not limited to such embodiments. Whether or not image analysis is actually performed may be determined by checking the value of attribute information. In this case, it is possible to save the calculation resources of edge server 60 or edge server 600.

Further, in the above-described embodiment, when vehicle 62 and in-vehicle device 650 can transmit only the image with such a resolution that the target attribute cannot be determined, the attribute information is added to the image. However, the present disclosure is not limited to such embodiments. For example, attribute information may always be added to the image. In this case, it is not necessary to transmit the target attribute from edge server 60 and in-vehicle device 650 to vehicle 62 and in-vehicle device 650. Edge server 60 and in-vehicle device 650 may determine what attribute is to be determined based on the image information added to the image.

The above embodiment takes a vehicle and a server as examples. However, the present disclosure is not limited to such embodiments. The present disclosure is similarly applicable to a so-called vehicle-to-vehicle.

In the above-described embodiment, after vehicle 62 or in-vehicle device 650 starts communication with edge server 60 or edge server 600, resolution selection table 150 or the like is transmitted from edge server 60 or edge server 600 to vehicle 62 or in-vehicle device 650. However, the present disclosure is not limited to such embodiments. For example, a server such as edge server 60 may send resolution selection table 150 to a server adjacent to itself, and request the server to distribute the resolution selection table to a vehicle entering its own coverage area in advance. Further, the identifier of edge server or edge server 600 may be added to resolution selection table 150. In this case, it is not necessary to delete resolution selection table 150 even if the vehicle goes out of the coverage area of edge server 60 or edge server 600. When the vehicle enters the coverage area of edge server 60 or edge server 600, whether or not resolution selection table 150 has been updated may be confirmed by communication between the vehicle and the server, and new resolution selection table 150 may be transmitted to the vehicle only when the resolution selection table has been updated. Also in this case, entire resolution selection table 150 may not be transmitted and only updated items may be transmitted.

The embodiments disclosed herein are to be considered in all respects as illustrative and not restrictive. The scope of the present disclosure is not indicated by the detailed description of the disclosure, but is indicated by the claims, and is intended to include all modifications within the meaning and scope equivalent to the wording of the claims.

REFERENCE SIGNS LIST

50 traffic assistance system
600 edge server
62 vehicle
64 imaging region
66, 110 pedestrian
68 tree
100, 120 image
102, 122 image
104 tree image
150 resolution selection table
160 detection attribute output table
180 communication device 182 driving assistance analysis unit
184 resolution selection table creation unit
186, 256 resolution selection table storage unit
188, 618 vehicle management unit
190 resolution selection table transmission unit
200 millimeter wave radar
202 camera
204 LiDAR
210, 650 in-vehicle device
230 I/F unit
232 image acquisition unit
234, 660 image data transmission unit
236 wireless communication device
238 driving assistance processing device
250 object/distance detection unit
252, 682 resolution decision unit
254, 684 table/target attribute reception unit
258 detection attribute output table generation unit
260 detection attribute output table storage unit
262 communication state determination unit
264, 692 transmission data generation unit
266 target attribute storage unit
280, 282, 284, 286, 288, 289, 290, 300, 302, 304, 330, 332, 334, 336, 350, 352, 354, 356,
357, 358, 360, 362, 364, 366, 368, 370, 372, 374, 376, 710, 711, 712, 730, 732 step
440 computer
442, 510 monitor
446 keyboard
448 mouse
450 DVD drive
452 DVD
454 network
456 semiconductor memory
460, 550 CPU
462, 552 bus
464, 566 GPU
466 ROM
468 RAM
470 hard disk drive
472 network I/F
474 semiconductor memory port
500 controller
502 GPS module
504 memory
506 power supply circuit
508 audio circuit
512 touch panel
514 various sensors
516 RF/baseband circuit
518 wireless communication module
554 memory controller
556 power supply management circuit
558 system management circuit
560 media processing circuit
562 display controller
564 input/output I/F
568 network I/F
570 in-vehicle network
608 resolution selection table DB creation unit
610 resolution selection table DB
612 resolution selection table dump processing unit
614 resolution selection table dump file storage unit
616 dump file transmission unit
686 resolution selection table DB restore unit
688 resolution selection table DB
690 resolution selection table DB search unit

The invention claimed is:

1. An image data transmission apparatus comprising:
circuitry configured to
decide on a resolution of an image captured by an imaging sensor, in accordance with a combination of a distance between the imaging sensor and an object and a type of an attribute that is a determination target;
generate transmission data from data of the image, in accordance with the resolution decided; and
wirelessly transmit the transmission data that has been generated to a transmission destination,
wherein the circuitry is further configured to
receive the attribute that is the determination target from the transmission destination, and
store the attribute that is the determination target.

2. The image data transmission apparatus according to claim 1, wherein the circuitry is further configured to:
receive, from the transmission destination, a resolution selection table indicating a correspondence relationship between the resolution of the image and the combination of the distance between the imaging sensor and the object and the type of the attribute that is the determination target, and
identify, from the resolution selection table, the resolution corresponding to the combination of the distance between the imaging sensor and the object and the type of the attribute that is the determination target.

3. The image data transmission apparatus according to claim 2, wherein the circuitry is further configured to:
measure an available communication band for wireless communication,
determine whether a transmission data amount in transmission of the data of the image to the transmission destination at a first transmission frame rate is greater than the available communication band measured, and
reduce a data amount of the image in response to determination being positive.

4. The image data transmission apparatus according to claim 3, wherein the circuitry is further configured to change a transmission frame rate of the data of the image to a second transmission frame rate smaller than the first transmission frame rate within a range permissible in communication with the transmission destination, in response to the determination being positive.

5. The image data transmission apparatus according to claim 3, wherein the circuitry is further configured to reconfigure the image to a reduced-size image having a smaller data amount, in response to the determination being positive.

6. The image data transmission apparatus according to claim 5, wherein the circuitry is further configured to:
reduce a data amount of the image such that the data of the image is transmittable to the transmission destination with the communication band, in response to data of the reconfigured image not being transmittable with the available communication band, and
add attribute information for identifying an attribute that can be determined based on the data of the image having the reduced data amount, to the data of the image having the reduced data amount.

7. The image data transmission apparatus according to claim 3, wherein the circuitry is further configured to:
convert the data of the image to reduce the resolution of the image until the image has a data amount transmittable at the first transmission frame rate, in response to the determination being positive, and add attribute information for identifying an attribute that can be determined based on the converted data of the image, to the converted data of the image.

8. An image data transmission method comprising:
deciding on, with circuitry of a computer, a resolution of an image captured by an imaging sensor, in accordance with a combination of a distance between the imaging sensor and an object and a type of an attribute that is a determination target;
generating, with the circuitry of the computer, transmission data from data of the image, in accordance with the resolution decided on in the deciding on of the resolution; and
wirelessly transmitting, with circuitry of a wireless communication device, the transmission data that has been generated to a transmission destination,
wherein the image data transmission method further includes
receiving the attribute that is the determination target from the transmission destination, and
storing the attribute that is the determination target.

9. A non-transitory computer-readable storage medium storing a computer program causing circuitry of a computer to be connected to an imaging sensor, a ranging sensor, and a wireless communication device to perform a method comprising:
deciding on a resolution of an image captured by the imaging sensor, in accordance with a combination of a distance between the imaging sensor and an object and a type of an attribute that is a determination target;
generating transmission data from data of the image, in accordance with the resolution decided; and
transmitting the transmission data that has been generated to a transmission destination via the wireless communication device,
wherein the image data transmission method further includes
receiving the attribute that is the determination target from the transmission destination, and
storing the attribute that is the determination target.

* * * * *